United States Patent
Sartori et al.

(10) Patent No.: US 10,292,191 B2
(45) Date of Patent: May 14, 2019

(54) SYSTEMS AND METHODS FOR CONTROL PLANE FOR D2D COMMUNICATIONS

(71) Applicant: Futurewei Technologies, Inc., Plano, TX (US)

(72) Inventors: Philippe Sartori, Plainfield, IL (US); Hossein Bagheri, Urbana, IL (US); Vipul Desai, Palatine, IL (US); Yishen Sun, Buffalo Grove, IL (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 141 days.

(21) Appl. No.: 14/664,621

(22) Filed: Mar. 20, 2015

(65) Prior Publication Data

US 2015/0282234 A1 Oct. 1, 2015

Related U.S. Application Data

(60) Provisional application No. 61/970,245, filed on Mar. 25, 2014.

(51) Int. Cl.
*H04W 72/04* (2009.01)
*H04W 28/02* (2009.01)
(Continued)

(52) U.S. Cl.
CPC ....... *H04W 76/14* (2018.02); *H04W 28/0278* (2013.01); *H04W 72/042* (2013.01); *H04W 92/18* (2013.01)

(58) Field of Classification Search
CPC ....... H04W 72/0406–72/042; H04W 28/0278; H04W 76/023; H04W 76/043; H04W 92/18
See application file for complete search history.

(56) References Cited

U.S. PATENT DOCUMENTS

| 2013/0150061 A1 | 6/2013 | Shin et al. |
| 2013/0322413 A1 | 12/2013 | Pelletier et al. |

(Continued)

FOREIGN PATENT DOCUMENTS

| CN | 102111751 A | 6/2011 |
| CN | 102291772 A | 12/2011 |

(Continued)

OTHER PUBLICATIONS

NTT DoCoMo, Inc., Buffer Status Report and Scheduling Request Triggers [R2-073574], 3GPP TSG RAN WG2 #59, Aug. 20-24, 2007, Athens, Greece, 4 pages.*

(Continued)

*Primary Examiner* — Hoon J Chung
(74) *Attorney, Agent, or Firm* — Slater Matsil, LLP

(57) ABSTRACT

System and method embodiments are provided for controlling and managing in-network device-to-device (D2D) communications. In an embodiment, a method for a UE performing device-to-device (D2D) communication includes generating a D2D buffer status report (BSR) for a D2D communication link between the UE and a second UE that provides information related to an amount of D2D data available for transmission, wherein the D2D BSR comprises a D2D BSR logical channel identifier (LCID); transmitting the D2D BSR in a control element; receiving, a resource allocation for the D2D link; and transmitting D2D data over the allocated resources.

10 Claims, 19 Drawing Sheets

(51) Int. Cl.
*H04W 76/14* (2018.01)
*H04W 92/18* (2009.01)

(56) References Cited

U.S. PATENT DOCUMENTS

| | | | |
|---|---|---|---|
| 2014/0023008 A1 | 1/2014 | Ahn et al. | |
| 2014/0038629 A1 | 2/2014 | Iwamura et al. | |
| 2014/0086152 A1* | 3/2014 | Bontu | H04L 1/1812 370/329 |
| 2014/0177542 A1* | 6/2014 | Novak | H04W 72/042 370/329 |
| 2014/0185467 A1* | 7/2014 | Heo | H04W 52/54 370/252 |
| 2015/0163689 A1* | 6/2015 | Lee | H04W 24/10 370/328 |
| 2017/0006649 A1* | 1/2017 | Zhao | H04W 28/06 |
| 2017/0013640 A1* | 1/2017 | Loehr | H04W 76/023 |

FOREIGN PATENT DOCUMENTS

| | | |
|---|---|---|
| EP | 2866483 A1 | 4/2015 |
| GB | 2494633 A | 3/2013 |
| JP | 2012227885 A | 11/2012 |
| WO | 02056627 A1 | 7/2002 |
| WO | 2013183727 A1 | 12/2013 |

OTHER PUBLICATIONS

International Search Report and Written Opinion of the International Searching Authority received in Patent Cooperation Treaty Application No. PCT/US2015/075000 dated Jul. 2, 2015, 12 pages.
"3rd Generation Partnership Project; Technical Specification Group Radio Access Network; Evolved Universal Terrestrial Radio Access (E-UTRA); Physical Channels and Modulation (Release 12)," 3GPP TS 36.211 V12.0.0, Dec. 2013, 120 pages.
"3rd Generation Partnership Project; Technical Specification Group Radio Access Network; Evolved Universal Terrestrial Radio Access (E-UTRA); Requirements for Support of Radio Resource Management (Release 11)," 3GPP TS 36.133 V11.4.0, Mar. 2013, 676 pages.
"3rd Generation Partnership Project; Technical Specification Group Radio Access Network; Evolved Universal Terrestrial Radio Access (E-UTRA); Physical Layer Procedures (Release 11)," 3GPP TS 36.213 V11.1.0, Dec. 2012, 160 pages.
"3rd Generation Partnership Project; Technical Specification Group Radio Access Network; Evolved Universal Terrestrial Radio Access (E-UTRA); and Evolved Universal Terrestrial Radio Access Network (E-UTRAN); Overall Description; Stage 2 (Release 11)," 3GPP TS 36.300 V11.3.0, Sep. 2012, 205 pages.
"3rd Generation Partnership Project; Technical Specification Group Radio Access Network; Evolved Universal Terrestrial Radio Access (E-UTRA); Medium Access Control (MAC) Protocol Specification (Release 11)," 3GPP TS 36.321 V11.2.0, Mar. 2013, 57 pages.
"3rd Generation Partnership Project; Technical Specification Group Radio Access Network; Evolved Universal Terrestrial Radio Access (E-UTRA); Requirements Resource Control (RRC) (Release 11)," 3GPP TS 36.331 V11.2.0, Dec. 2012, 340 pages.
"3rd Generation Partnership Project; Technical Specification Group Services and System Aspects; Feasibility Study for Proximity Services (ProSe) (Release 12)," 3GPP TR 22.803 V12.0.0, Dec. 2012, 40 pages.
Lindbom, L. et al., Enhanced Inter-Cell Interference Coordination for Heterogeneous Networks in LTE-Advanced: A Survey, Dec. 7, 2011, 18 pages.
"Signaling Mechanisms for TDD eIMTA," 3GPP TSG RAN WG1 Meeting #72bis, R1-130883, Agenda Item 7.2.3.2, Apr. 15-19, 2013, 5 pages.
"Introduction of ProSe," 3GPP TSG-RAN WG2 Meeting #89, R2-150567, Change Request, Version 12.4.0, Athens Greece, Feb. 10-14, 2015, 32 pages.
"Corrections to Stage 2 Description of ProSe," 3GPP TSG-RAN WG2 Meeting #89, R2-150645, Change Request, Version 12.4.0, Athens Greece, Feb. 9-13, 2015, 15 pages.
"Introduction of ProSe," 3GPP TSG-RAN WG2 Meeting #89, Draft R2-150646, Change Request, Version 12.4.1, Athens Greece, Feb. 9-13, 2015, 88 pages.
"Fully scheduled D2D transmission in LTE-coverage," ETRI, 7.5.3.1, 3GPP TSG-RAN WG2 #84, R2-134095, Nov. 11-15, 2013, 3 pages, San Francisco, USA.
"Resource allocation for D2D transmitters in coverage," Ericcson, 7.5,3, 3GPP TSG-RAN WG2 #85, Tdoc R2-140625, Feb. 10-14, 2014, 5 pages, Prague, Czech Republic.

* cited by examiner

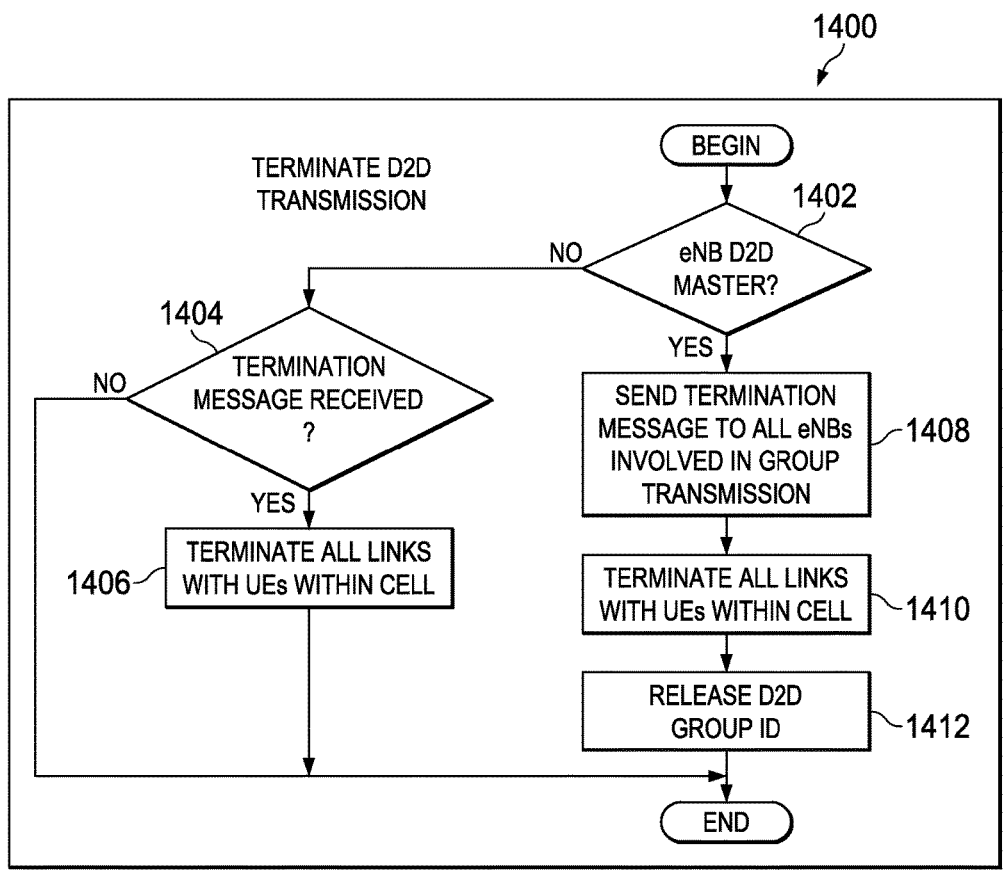
FIG. 14
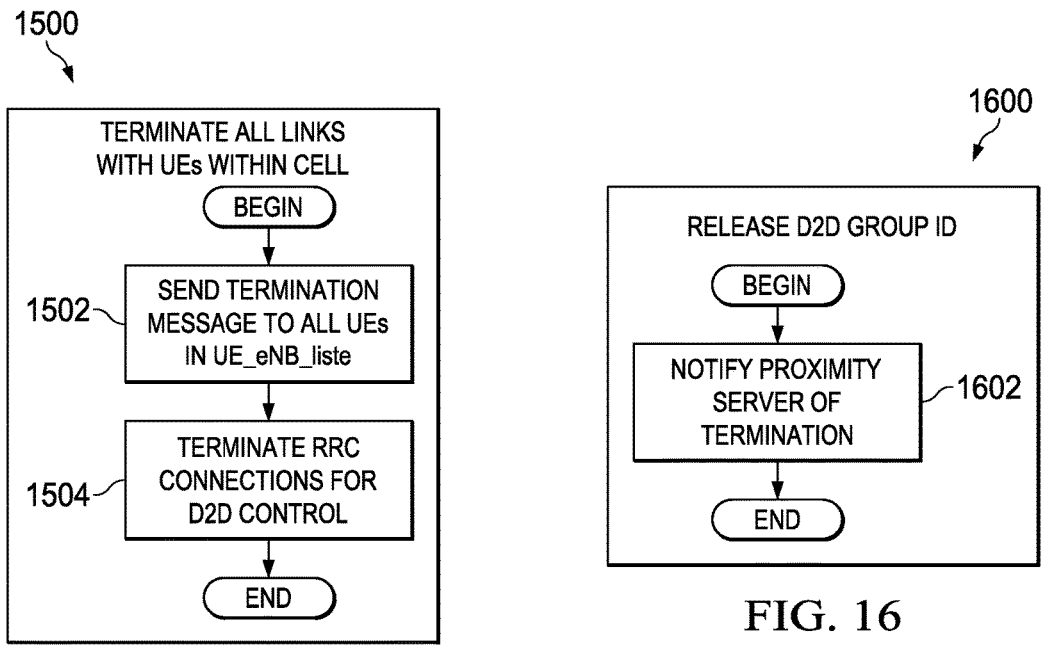
FIG. 15
FIG. 16

US 10,292,191 B2

SYSTEMS AND METHODS FOR CONTROL PLANE FOR D2D COMMUNICATIONS

This application claims the benefit of the following provisionally filed U.S. Patent application: Application Ser. No. 61/970,245, filed Mar. 25, 2014, and titled "System and Method for Control Plane for D2D Communications," which application is hereby incorporated by reference.

TECHNICAL FIELD

The present invention relates to a system and method for wireless communications, and, in particular embodiments, to a system and method for control plane for D2D communications.

BACKGROUND

Device-to-device (D2D) technology is attractive and getting a lot of attention because of its ability to offer new services, improve system throughput, and offer a better user experience. Potential use cases for D2D have been identified by 3GPP SA WG1 in [1]. Standardization work is ongoing in 3GPP.

There are two main identified D2D technologies: discovery and communication. In discovery, a user equipment (UE) attempts to discover neighboring UEs in its vicinity, either on its own or directed by the base station or enhanced Node B (eNB). In communication, one UE directly communicates with another UE without the data transiting through the eNB.

SUMMARY

In an embodiment, a method for a UE performing device-to-device (D2D) communication includes generating a D2D buffer status report (BSR) for a D2D communication link between the UE and a second UE that provides information related to an amount of D2D data available for transmission, wherein the D2D BSR comprises a D2D BSR logical channel identifier (LCID); transmitting the D2D BSR in a control element; receiving, a resource allocation for the D2D link; and transmitting D2D data over the allocated resources.

In an embodiment, a method for managing a device-to-device (D2D) communication includes transmitting a D2D configuration information to a user equipment (UE); receiving a D2D buffer status report (BSR) for a D2D communication link, wherein the D2D BSR comprises an amount of D2D data available for transmission at the UE and comprises a logical channel identifier (LCID) for the D2D BSR; allocating resources for a D2D link; and transmitting the resource allocation the UE.

In an embodiment, a method for managing a D2D communication at an eNB includes receiving information about a D2D UE group communication, wherein the information comprises a D2D group ID for a D2D communication link, the identity of a D2D group master, and information related to the at least one eNBs managing the D2D communication link; determining that the eNB is the D2D group master; and communicating a resource allocation to at least one of the eNBs for at least one D2D UE in the D2D group.

In an embodiment, a method for a UE performing device-to-device (D2D) communication generating a D2D buffer status report (BSR) for a direct D2D communication link between the UE and a second UE that provides information related to an amount of D2D data available for transmission, wherein the D2D BSR comprises a D2D group ID; transmitting the D2D BSR in a control element; receiving a resource allocation for the D2D link; and transmitting over the allocated resources.

In an embodiment, a wireless device performing device-to-device (D2D) communication includes a processor and a non-transitory computer readable storage medium storing programming for execution by the processor, the programming including instructions to: transmit a D2D configuration information to a user equipment (UE); receive a D2D buffer status report (BSR) for a D2D communication link, wherein the D2D BSR comprises an amount of D2D data available for transmission at the UE and comprises a logical channel identifier (LCID) for the D2D BSR; allocate resources for a D2D link; and transmit the resource allocation the UE.

In an embodiment, a network component for managing a device-to-device (D2D) communication includes a processor and a non-transitory computer readable storage medium storing programming for execution by the processor, the programming including instructions to: generate a D2D buffer status report (BSR) for a D2D communication link between the UE and a second UE that provides information related to an amount of D2D data available for transmission, wherein the D2D BSR comprises a D2D BSR logical channel identifier (LCID); transmit the D2D BSR in a control element; receive a resource allocation for the D2D link; and transmit D2D data over the allocated resources.

BRIEF DESCRIPTION OF THE DRAWINGS

For a more complete understanding of the present invention, and the advantages thereof, reference is now made to the following descriptions taken in conjunction with the accompanying drawing, in which:

FIG. 14 is a flowchart illustrating an embodiment of a method for terminating D2D transmission;

FIG. 15 is a flowchart of an embodiment of a method to terminate all links with UEs within cell;

FIG. 16 is a flowchart of an embodiment of a method for releasing a D2D group ID;

DETAILED DESCRIPTION OF ILLUSTRATIVE EMBODIMENTS

Figure 1:
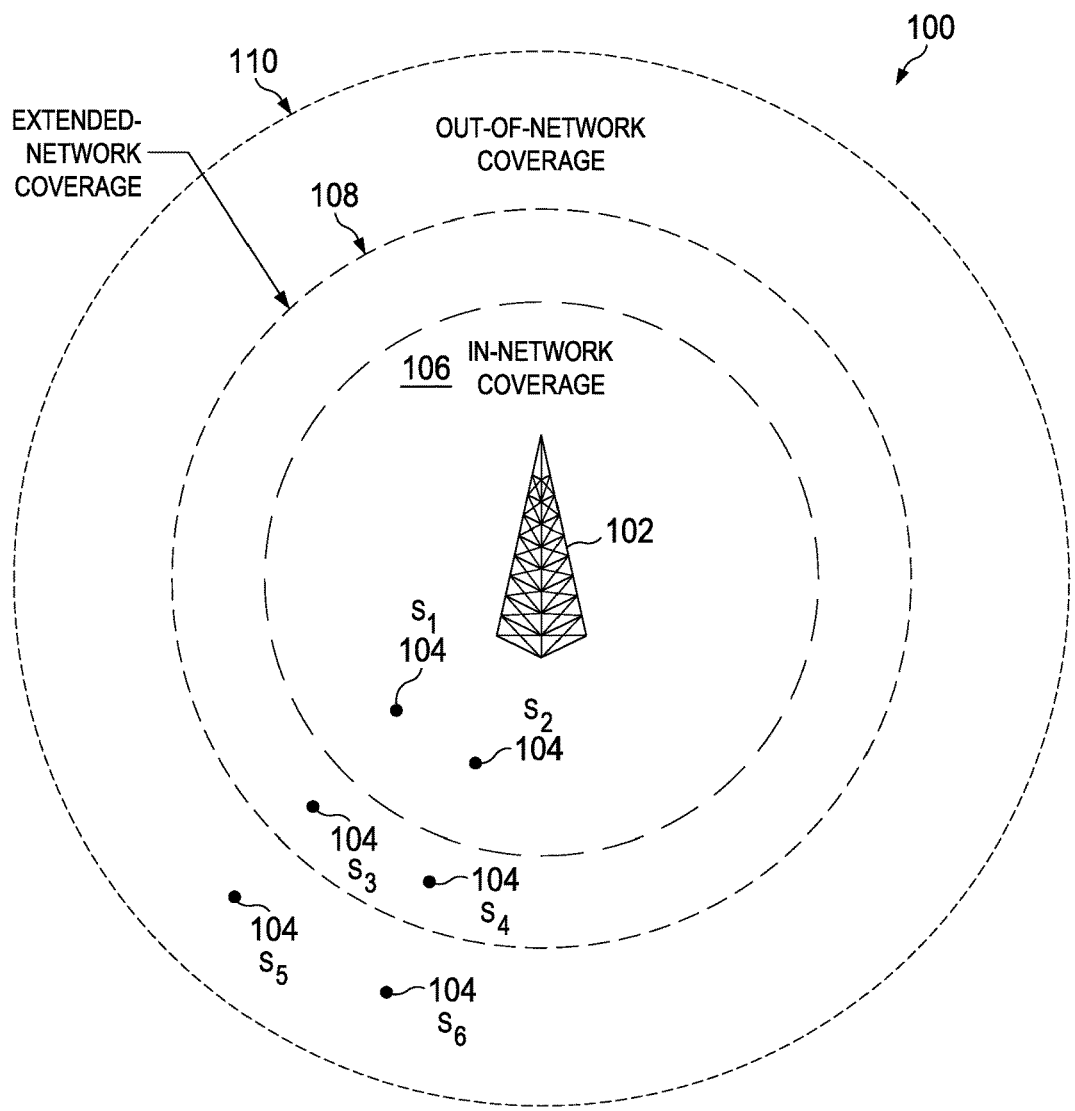
FIG. 1 is a diagram of an embodiment system for wireless communications.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods for device-to-device (D2D) communications.

In one embodiment, a method for a control plane for device-to-device (D2D) communications includes a base station receiving, from a proximity server, group information for the D2D communications, wherein the group information indicates the base station is a master base station, and updating, in accordance with the group information, a list of user equipment (UEs) in a D2D group, a list of base stations acting as serving base stations for the UEs in the D2D group, and proximity information for the UEs in the D2D group. The method also includes obtaining buffer status reports for the UEs in the D2D group and determining a resource allocation for the UEs in the D2D group in accordance with the buffer status reports. The method further includes sending the resource allocation to the UEs in the D2D group that are being served by the master base station, and indicating the resource allocation to the base stations acting as serving base stations for the UEs in the D2D group.

In an embodiment, disclosed herein is a method in a network device for controlling in-network device-to-device (D2D) communications includes receiving, at the network device, a scheduling request (SR) from a user equipment (UE) involved in D2D communication, the SR comprising a D2D buffer status report (BSR), the D2D BSR comprising a logical channel identifier (LCID) and a buffer size of data available for transmission via D2D in the UE, the LCID identifying a D2D group; determining, by the network device, a transmission resource allocation for the D2D communication for the UE according to the BSR; and sending, by the network device, the transmission resource allocation to the UE. The D2D BSR is received via a media access control (MAC) layer message. The MAC layer message comprises a MAC header that includes the LCID. The transmission resource allocation includes a time frame within which the UE can transmit the data available for transmission via D2D communications with another UE. The method may also include receiving a report of loss of D2D link from the UE; sending a request to remove the UE from the group to a proximity server in response to the UE capable of direct mode only; and sending a request to switch the UE to cellular and switch links involving the UE to cellular to the proximity server in response to determining the UE is capable of cellular operation. The method may include receiving, by the network device, group information for the D2D communications from a proximity server, wherein the group information indicates the network device is a master base station; and updating, in accordance with the group information, a list of UEs in a D2D group, a list of base stations acting as serving base stations for the UEs in the D2D group, and proximity information for the UEs in the D2D group. In an embodiment, the network device is a master enhanced Node B (eNB) and the method also includes receiving from a slave eNB serving at least one UE in a group of UEs participating in D2D communication at least one of D2D BSR, cellular BSR, distribution of worst channel to each UE served by the slave eNB, maximum number of resources the slave eNB can allocate to D2D communications, and location of resources the slave eNB can allocate to D2D. Additionally, the method may include receiving a termination message from a proximity server; sending a termination message to all enhanced Node Bs (eNBs) involved in group transmission; and terminating all links with UEs within the network component's cell.

In an embodiment, disclosed herein is a method in a proximity server for managing device-to-device (D2D) communication within a network includes receiving, at the proximity server, a request to initiate group communication from an enhanced Node B (eNB); establishing, by the proximity server, a radio resource control (RRC) connection with UEs in the group; obtaining, by the proximity server, proximity information for UEs in the group; notifying, by the proximity server, each eNB that serves at least one of the UEs in the group of the group information, wherein the group information comprises a UE list identifying the UEs in the group, a proximity matrix indicating a relative proximity of the UEs to each other, a eNB list identifying the eNBs that serve the UEs, and an identity of a master eNB. The method may also include receiving a remove UE from the group request from one of the eNBs; updating the group information, wherein updating the group information comprises updating a UE list, a proximity matrix, and an eNB list according to the remove UE from the group request; and notifying the eNBs of the updated group information. The method may include receiving a UE handoff notification, wherein the UE handoff notification indicates that a serving eNB for the UE has been changed; updating the group information, wherein updating the group information comprises updating a UE list, a proximity matrix, and an eNB list according to the UE handoff notification; and notifying the eNBs of the updated group information. Additionally, the method may include establishing a RRC connection with a new UE in the group; establishing proximity information for the UEs in the group; updating the group information according to the new UE; and notifying the eNBs of the updated group information.

FIG. 1 is a diagram of an embodiment system 100 for wireless communications. There are various scenarios based on device location relative to the position of a communications controller (e.g., an enhanced node B (eNB)). System 100 includes six wireless devices 104, labeled $s_1$ to $s_6$, placed in regions about an eNB 102. Devices $s_1$ and $s_2$ are in-network coverage (IC or IN) 106 and can establish communication links with the eNB 102. Devices $s_5$ and $s_6$ are out-of-network coverage (OOC) 110 and cannot establish any direct communication link with the eNB 102. There is a region, called extended-network coverage 108, where devices 104, such as $s_3$ and $s_4$, may observe some transmissions from the eNB 102 but they may not be able to establish a communication link with the eNB 102. Herein below, this disclosure primarily focuses on the IC 106 case.

There are two major approaches to implementing D2D: a device-centric approach and a network-managed approach. In the device-centric approach, the functionality to enable D2D resides almost entirely on the mobile device, while network involvement is very minimal. In fact, direct communications between devices forms an overlay on top of the cellular network. The traditional functions of the cellular network, such as resource allocation and management, are performed in an ad-hoc manner between the individual devices, without the benefit of network oversight or management. This not only limits the potential performance gains from D2D, but also introduces major challenges in supporting many key functions currently provided by the cellular network. Among these challenges are: ensuring the security of user data and protecting user identity/location from being discovered by unauthorized parties, enabling the network operator to charge for D2D and proximity as a service, supporting lawful intercept for all potential communications between devices, and generally the scalability of the solution to different deployment scenarios and densities of devices.

In a network-managed approach, D2D can complement and enhance the capabilities of the network, and enable more efficient utilization of radio resources for proximate communications. The network can constantly supervise the usage of direct vs. infrastructure routing of users' data to achieve the most efficient utilization of resources, minimize interference, and to benefit the network as a whole. The key features inherent to the cellular network can be relatively easily extended to support D2D with a network-managed approach.

In addition to the use cases and modes, UEs may have several operating states such as radio resource control (RRC) protocol states RRC_IDLE and RRC_CONNECTED. Currently, a UE is allowed to transmit during the RRC_CONNECTED state. The random access procedure may be used by the UE to transition between the RRC_IDLE and RRC_CONNECTED states. In the RRC_CONNECTED state, the network manages the device and system resources. Managing can involve authentication, exchange of information, and indicating when a device can transmit/receive. Specifically, the functionalities listed in [10] are as follows.

RRC_IDLE:
PLMN selection;
DRX configured by NAS;
Broadcast of system information;
Paging;
Cell re-selection mobility;
The UE shall have been allocated an id which uniquely identifies the UE in a tracking area;
No RRC context stored in the eNB.

RRC_CONNECTED:
UE has an E-UTRAN-RRC connection;
UE has context in E-UTRAN;
E-UTRAN knows the cell which the UE belongs to;
Network can transmit and/or receive data to/from UE;
Network controlled mobility (handover and inter-RAT cell change order to GERAN with NACC);
Neighbour cell measurements;
At PDCP/RLC/MAC level:
UE can transmit and/or receive data to/from network;
UE monitors control signalling channel for shared data channel to see if any transmission over the shared data channel has been allocated to the UE;
UE also reports channel quality information and feedback information to eNB;

The DRX period can be configured according to UE activity level for UE power saving and efficient resource utilization. This is under control of the eNB.

For D2D communications, it is envisioned that devices participating in communication with each other are operating in the RRC_CONNECTED state.

An embodiment provides control plane solutions for in-network (IN) D2D communication.

An embodiment provides management of group communication spanning several cells with new entrants/UEs leaving. One eNB acts as master, and group ID assignment & release and resource allocation are provided. New entrants/UEs leaving the group communication or doing handoff are managed, including a proximity matrix update. The matrix is useful, e.g., to decide which links should be D2D/cellular in group communication. Triggering of type-2 discovery may be used when a UE gets lost/needs to enter group. Type 2 discovery is a discovery type where the eNB allocates resources for discovery.

An embodiment provides signaling to support these procedures. For over-the-air, long-term D2D channel information (e.g., worst link) from each UE (this can be tied to periodic BSR time) is signaled. Resource allocation signaling (may be from patterns) is provided to group members. A pool of resources can be signaled. Signaling is provided for terminate D2D transmission, switch to cellular commands, and add/remove a UE. RRC signaling or PDCCH order may be used, and D2D RLF is provided. For eNB to eNB communications, an embodiment provides signaling for resource allocation (BSR-REQ, (D2D, cellular) BSR, maximum number or location of resources slave eNB can allocate to D2D, resource allocation decision (may be from patterns)). For eNB-PDCF communications, an embodiment provides signaling for D2D group info, terminate group communications, and add/remove a UE.

An embodiment supporting measurement procedure includes long-term channel info (measurement configuration parameters), where each UE knows when to measure which UE's signal. This can be time implicit.

With respect to D2D communication control, the state machine describing the UE comprises two states: "No D2D mode" and "D2D mode." "No D2D mode" state is the state where the UE communicates with the network only, and it may receive certain D2D related configuration from the network. "D2D mode" state is the state where the UE communicates both with the network and D2D UEs.

Figure 2:
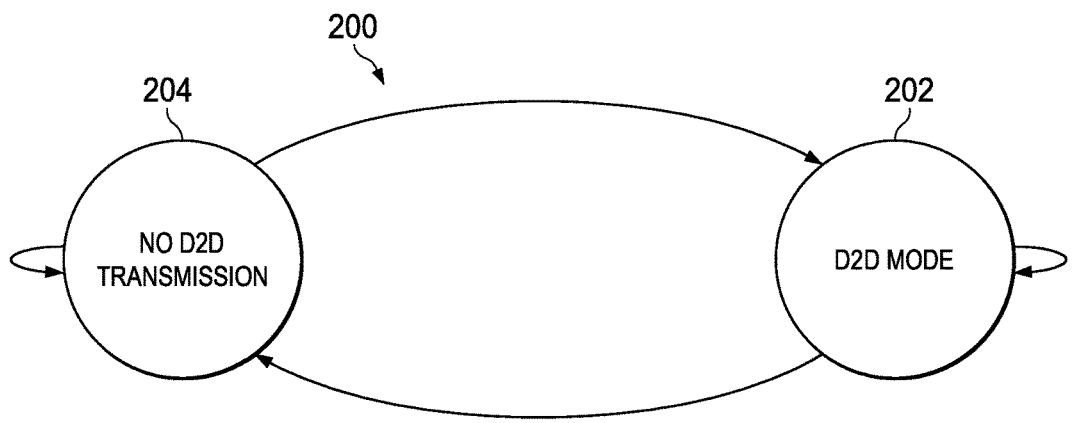
FIG. 2 illustrates UE communication states.

FIG. 2 illustrates UE communication states 200. The communication states for a UE may be D2D mode state 202 where the UE communicates directly with another device or no D2D transmission mode state 204.

The "No D2D transmission mode" state 204 corresponds to the normal cellular operation. In this state, the UE cannot perform D2D communication. After assessing if D2D communication is possible both by the UE itself and the network, the UE checks whether it has received a D2D-group-ID. This assessment may be performed on a subframe-by-subframe basis, or with another time granularity. If yes, then it checks whether it has been assigned a D2D-UE-ID. The UE may already have obtained the ID by means of discovery. Afterwards, the UE attempts to decode the received D2D communication SIB configuration message for the group, and if the next subframe is configured as a D2D communication subframe, the UE can perform D2D communication.

Figure 3:
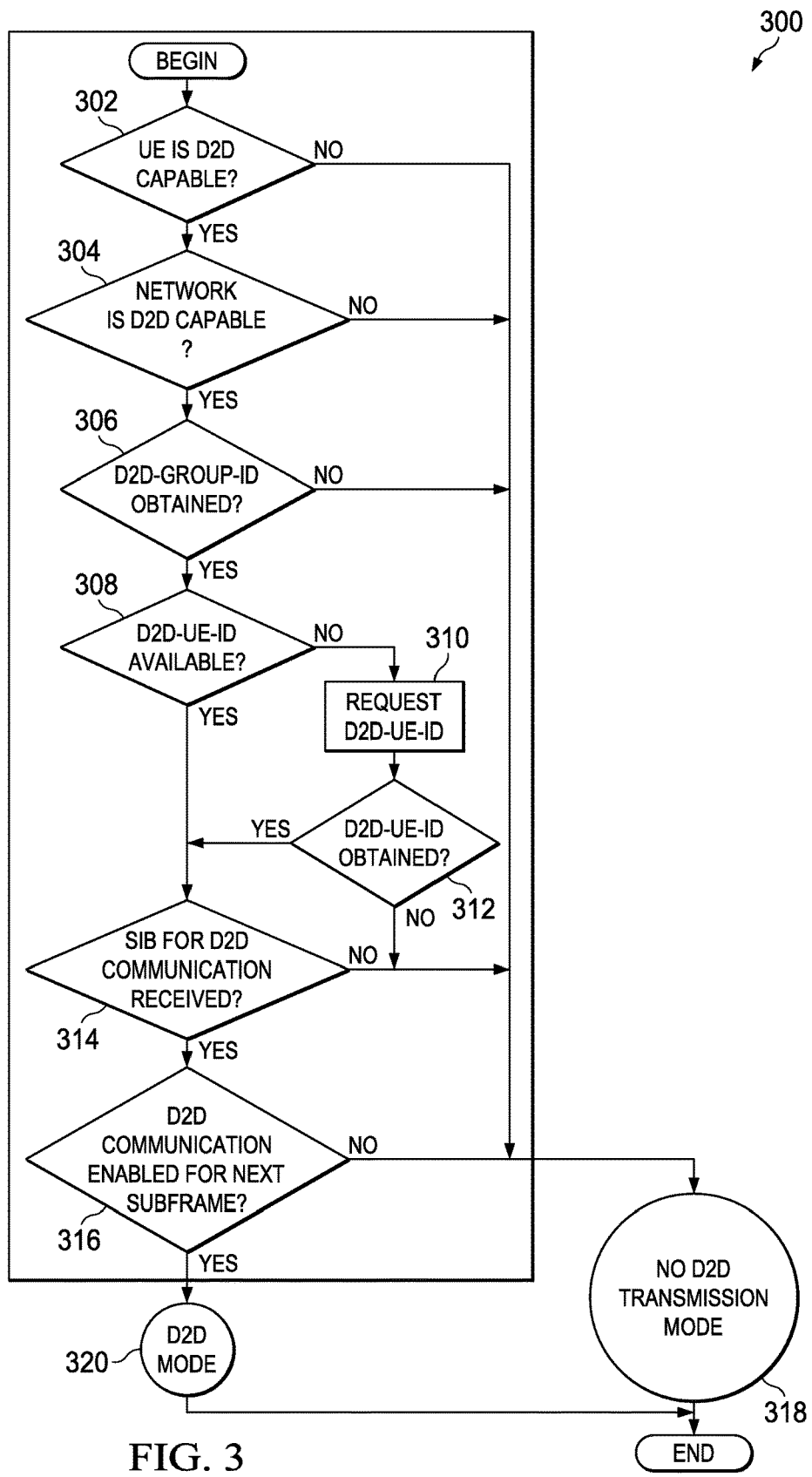
FIG. 3 illustrates a flowchart of an embodiment of a method for determining whether the UE can perform D2D communication.

FIG. 3 illustrates a flowchart of an embodiment method 300 for determining whether the UE can perform D2D communication. In an embodiment, the blocks 302 through 316 are performed while the UE is in the "No D2D transmission" mode state. The method 300 begins at block 302 where the UE determines whether the UE is D2D capable. A UE may be D2D capable if a UE capability indicates the possibility to perform D2D discovery, D2D communication, or both. If at block 302, the UE determines that it is not D2D capable, then the method 300 proceeds to block 318 where the UE remains in "No D2D transmission" mode. If, at block 302, the UE is determined to be D2D capable, the method 300 proceeds to block 304 where the UE determines whether the network is D2D capable. The network may not be D2D capable if it is a network complying to an earlier LTE release than Rel-12. If, at block 304, the UE determines that the network is not D2D capable, the method 300 proceeds to block 318 where the UE remains in "No D2D transmission" mode. If the UE determines that the network is D2D capable, the method 300 proceeds to block 306 where the UE determines whether a D2D-group-ID has been obtained from the network. The UE determines if it has a D2D UE ID in block 308. If not, in block 310, the UE requests from the network a D2D UE ID. If UE determines that it did not obtain the D2D UE ID in block 312, the UE remains in the "No D2D transmission" mode as indicated by block 318. Once the UE has a D2D UE ID, in block 314 the UE attempts to obtain the system information block (SIB) for D2D communications. If not D2D SIB communication is received, UE remains in the "No D2D transmission" mode. In a typical operating mode, the D2D SIB configuration message is decoded only once it is updated. Since all UEs in the D2D communications are in RRC_CONNECTED mode, D2D SIB configuration updates may be indicated by a value tag in SIB 1. Upon success, the UE can enter the D2D mode state in block 320.

An alternative of the operations shown in FIG. 3 may be:
perform all procedures in FIG. 3 upon the initialization of UE's D2D state;
once the UE is determined to be in "No D2D transmission mode," perform checking procedures blocks 302, 304, 306, 308, 310, 312, and 314 only if there are any updates on the associated information/configuration. If there are no updates, the UE only needs to check whether D2D communication is enabled (block 316) for the next subframe.

Figure 4:
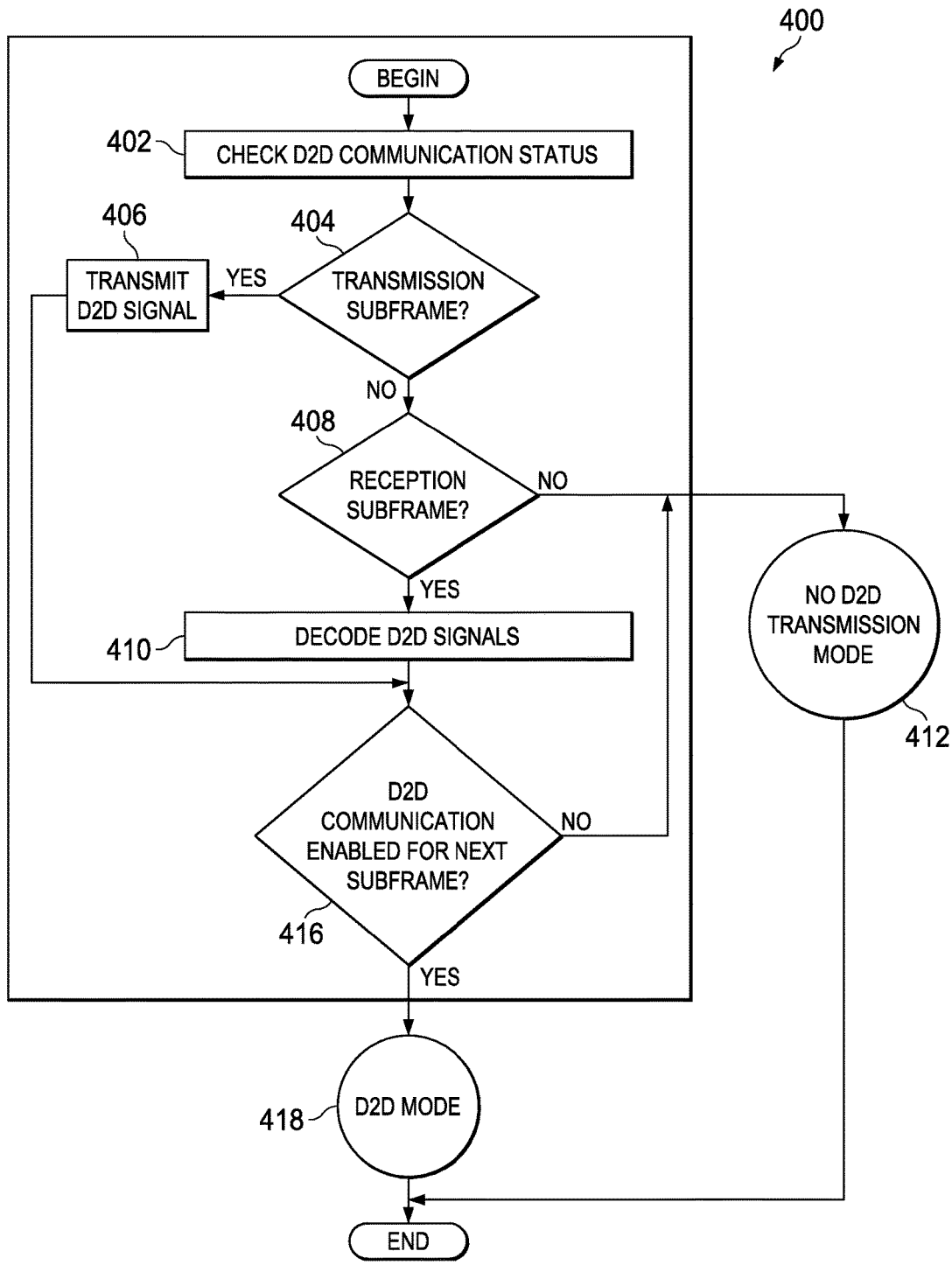
FIG. 4 is a flowchart of an embodiment of a method for checking procedures performed during the "D2D mode" state.

FIG. 4 is a flowchart of an embodiment method 400 for checking procedures performed during the "D2D mode" state 320. D2D operations typically occur on subframes designated from uplink cellular operation. The method 400 begins at block 402 where the UE checks the D2D communication status and then proceeds to block 404 where the UE determines whether the UE has a D2D communication signal to transmit in this subframe. If the UE does have a D2D signal to transmit, the method 400 proceeds to block 406 where the UE transmits the D2D signal. If the UE does not have a D2D signal to transmit, the method 400 proceeds to block 408 where the UE determines whether a D2D signal has been received in this subframe. If no D2D signal has been received, the method proceeds to block 412 where the UE transitions to a "No D2D transmission mode," after which, the method 400 ends. If, at block 408, the UE determines that it has received a D2D signal, the method 400 proceeds to block 410 where the UE decodes the D2D signals. Upon completion of block 406 or block 410, the method proceeds to block 416 where the UE determines whether D2D communication is enabled for the next subframe. If D2D communications is enabled for the next subframe, the method 400 proceeds to block 418 where the UE remains in D2D mode, after which, the method 400 ends. If, at block 416, the UE determines that D2D communications is not enabled for the next subframe, the method 400 proceeds to block 412, where the UE transitions to a "No D2D transmission mode," after which, the method 400 ends.

Thus, in the "D2D mode" state 320, for every D2D communication subframe, the UE starts by performing a series of checking procedures in the "check D2D communication status" process 400. Then, assuming that all the checks are passed, the UE checks if the D2D communication subframe is the one where it should transmit or not. If it should transmit, and is allowed to do so, the UE transmits. Similarly, if the D2D communication subframe is the one where it should decode the D2D signal of another group member and is allowed to do so, it performs the decoding. Once this is done, it moves to the next D2D communication subframe.

FIG. 4 illustrates "D2D mode" state, where the blocks 402, 404, 406, 408, 410, and 416 are executed while the UE is in the "D2D mode" state.

Figure 5:
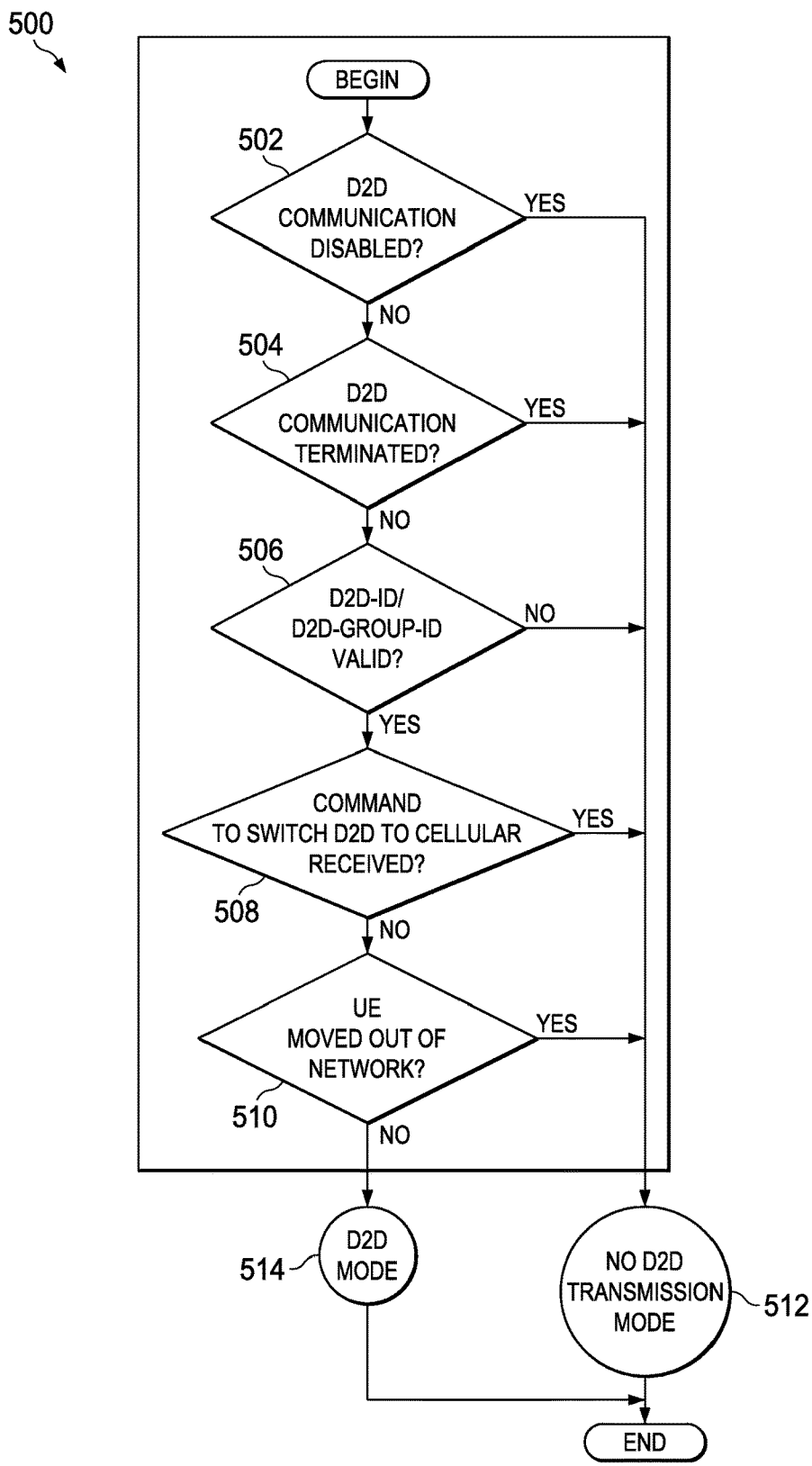
FIG. 5 is a flowchart of an embodiment of a method to check the D2D communication status process where the UE performs a battery of checks to see if some parameters need some updating in the D2D communication process.

FIG. 5 is a flowchart of an embodiment method 500 to check the D2D communication status process where the UE performs a series of checks to see if some parameters need some updating in the D2D communication process. In an embodiment, blocks 502, 504, 506, 508, and 510 are the checks inside the check D2D communication status process. The method 500 begins at block 502 where the UE determines whether D2D communication is disabled. If the D2D communication is disabled, then the method 500 proceeds to block 512 where the UE transitions to "No D2D transmission mode," after which the method 500 ends. If D2D communications is not disabled, then the method 500 proceeds to block 504 where the UE determines whether D2D communication has terminated. If D2D communication has terminated, then the method 500 proceeds to block 512 where the UE transitions to "No D2D transmission mode," after which the method 500 ends. If the D2D communication has not been terminated, then the method 500 proceeds to block 506 where the UE determines if the D2D-ID and the D2D-group-ID are valid. If either the D2D-ID or the D2D-group-ID are not valid, then the method 500 proceeds to block 512 where the UE transitions to "No D2D transmission mode," after which the method 500 ends. If the D2D-ID and the D2D-group-ID are valid, then the method 500 proceeds to block 508 where the UE determines whether a command to switch D2D to cellular has been received. If a command to switch the D2D to cellular has been received, then the method 500 proceed to block 512 where the UE transitions to "No D2D transmission mode," after which the method 500 ends. If no command to switch D2D to cellular has been received, then the method 500 proceeds to block 510 where the UE determines whether the UE has moved out of the network. If the UE has moved out of the network, then the method 500 proceeds to block 512 where the UE transitions to "No D2D transmission mode," after which the method 500 ends. If the UE has not moved out of the network, then the method 500 proceeds to block 514 where the UE remains in "D2D mode," after which, the method 500 ends.

Among the checks performed are:
whether D2D communication is disabled: in this case, the UE goes back to the "No D2D transmission" state where either D2D communication will be terminated or reconfigured.
whether D2D communication is terminated: in this case, the UE goes back to the "No D2D transmission" state.
whether eNB has instructed the UE to switch its D2D transmission to cellular: in this case, the UE goes back to the "No D2D transmission" state, and resumes its group communication through the eNB.
whether the UE has moved out of network. D2D signal transmission is immediately stopped, and the UE goes into the "initiate out-of-network D2D" state, wherein basically it follows procedures corresponding to out-of-network.
whether its D2D ID and the corresponding transmission parameters need to be updated.

In an embodiment, the eNB is the entity the most involved in the D2D communication control. The state machine describing the eNB comprises two states:
"No D2D mode" state: this is the state where the eNB does not do anything to facilitate D2D operation.
"D2D mode" state: this is the state where the eNB facilitates D2D operation.

Figure 6:
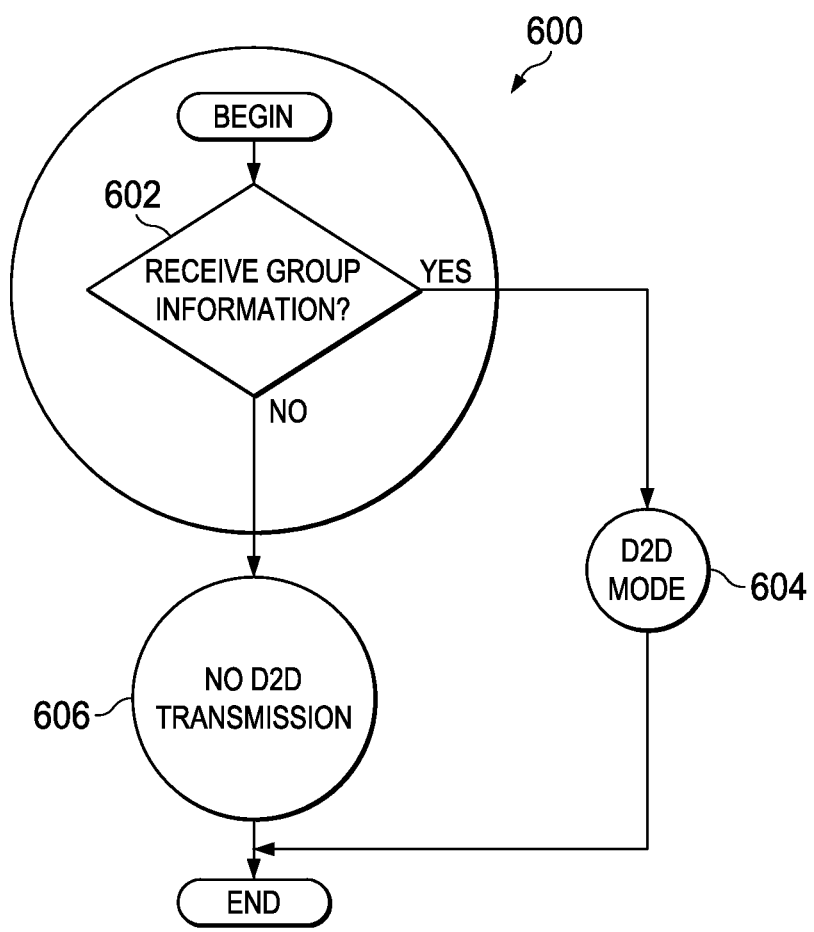
FIG. 6 is a flowchart of an embodiment of a method of a state diagram for the eNB communication C-plane.

FIG. 6 is a flowchart of an embodiment of a method 600 of a state diagram for the eNB communication control plane (C-plane) for a group. The method 600 begins at block 602 where the eNB determines whether it has received group information such as a group identity, a list of group members, and such. If group information has been received, the method 600 proceeds to block 604 where the eNB enters or remains in the "D2D mode" state, after which the method 600 ends. If no group information has been received, then the method 600 proceeds to block 606 where the eNB remains or transitions to "No D2D mode" state for the group, after which, the method 600 ends. Note, since the eNB determines the usage of uplink resources on a particular subframe, the determination of the D2D mode state for the group at the eNB may before the UE examines its D2D state.

Figure 7:
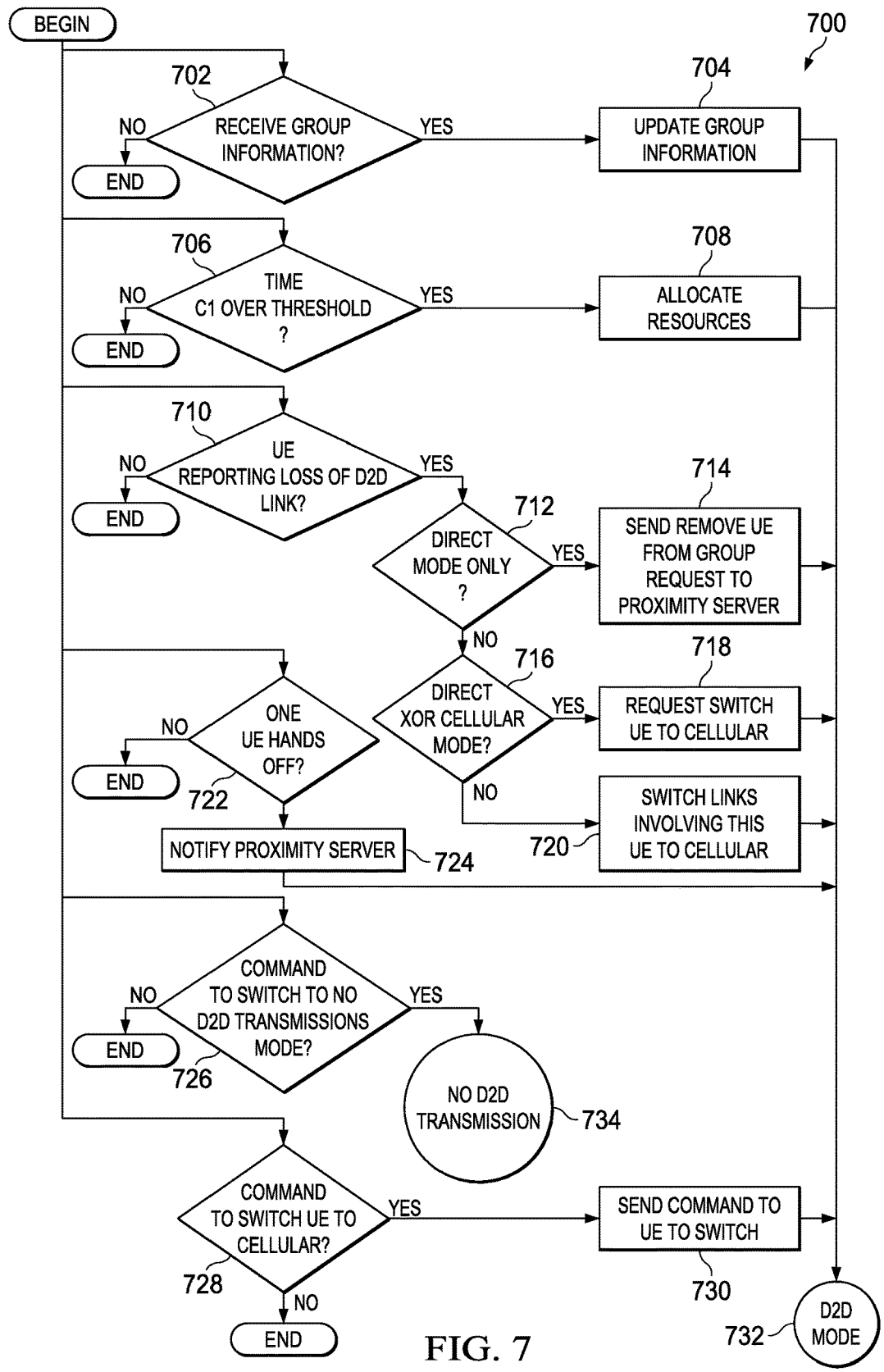
FIG. 7 is a flowchart of an embodiment of a method for eNB operation.

The "No D2D Transmission" State corresponds to the normal cellular operation. There is one operation linked to D2D operation, as shown in FIG. 7 which is a flowchart of an embodiment of a method 700 for eNB operation. The eNB checks whether it has received information about a D2D group from the proximity server. If it has, this means that at least one D2D group is active and is authorized for direct communication. The eNB then moves to the "D2D mode" state. Otherwise, the eNB stays in the "no D2D transmission" state. Once in the "D2D mode" state, the eNB can execute any of the functions depicted in FIG. 7. These functions can be implemented in response to a trigger, can be executed simultaneously, or in any order. Thus, the method 700 may begin at any of blocks 702, 706, 710, 722, 726, and 728. At block 702, the eNB determines if it has received group information. If no, then the method 700 may end. If yes, then the method 700 proceeds to block 704 where the eNB updates group information, after which, the method proceeds to block 732 where the eNB remains in the "D2D mode" state.

At block 706, the eNB determines if time C1 is over a threshold. If no, then the method 700 may end. If yes, then the method 700 proceeds to block 708 where the eNB allocates resources, after which, the method 700 proceeds to block 732 where the eNB remains in the "D2D mode" state.

At block 710, the eNB determines if the UE is reporting a loss of a D2D link. If no, then the method 700 may end. If yes, then the method 700 proceeds to block 712 where the eNB determines if the UE is using direct mode only. If yes, then the method 700 proceeds to block 714 where the eNB sends a remove the UE from the group request to the proximity server, after which, the method 700 proceeds to block 732 where the eNB remains in the "D2D mode" state. If no, then the method 700 proceeds to block 716 where the eNB determines if the UE is in direct XOR cellular mode. If yes, then the method 700 proceeds to block 718 where the eNB requests to switch the UE to cellular mode, after which, the method 700 proceeds to block 732 where the eNB remains in the "D2D mode" state. If no, then the method 700 proceeds to block 720 where the eNB switches links involving this UE to from D2D to cellular, after which, the method 700 proceeds to block 732 where the eNB remains in the "D2D mode" state.

At block 722, the eNB determines if one of the UE should be handed off to a different cell and eNB. If no, then the method 700 may end. If yes, then the method 700 proceeds to block 724 where the eNB notifies the proximity server that the UE needs to be handed off, after which, the method 700 proceeds to block 732 where the eNB remains in the "D2D mode" state.

At block 726, the eNB determines whether it has received a command to switch to no D2D transmission mode. If no, then the method 700 may end. If yes, then the method 700 proceeds to block 734 where the eNB switches to "No D2D transmission mode" state.

At block 728, the eNB determines whether a command to switch the UE to cellular has been received. If no, then the method 700 may end. If yes, then the method 700 proceeds to block 730 where the eNB sends a command to UE to switch to cellular mode, after which, the method 700 proceeds to block 732 where the eNB remains in the "D2D mode" state.

Figure 8:
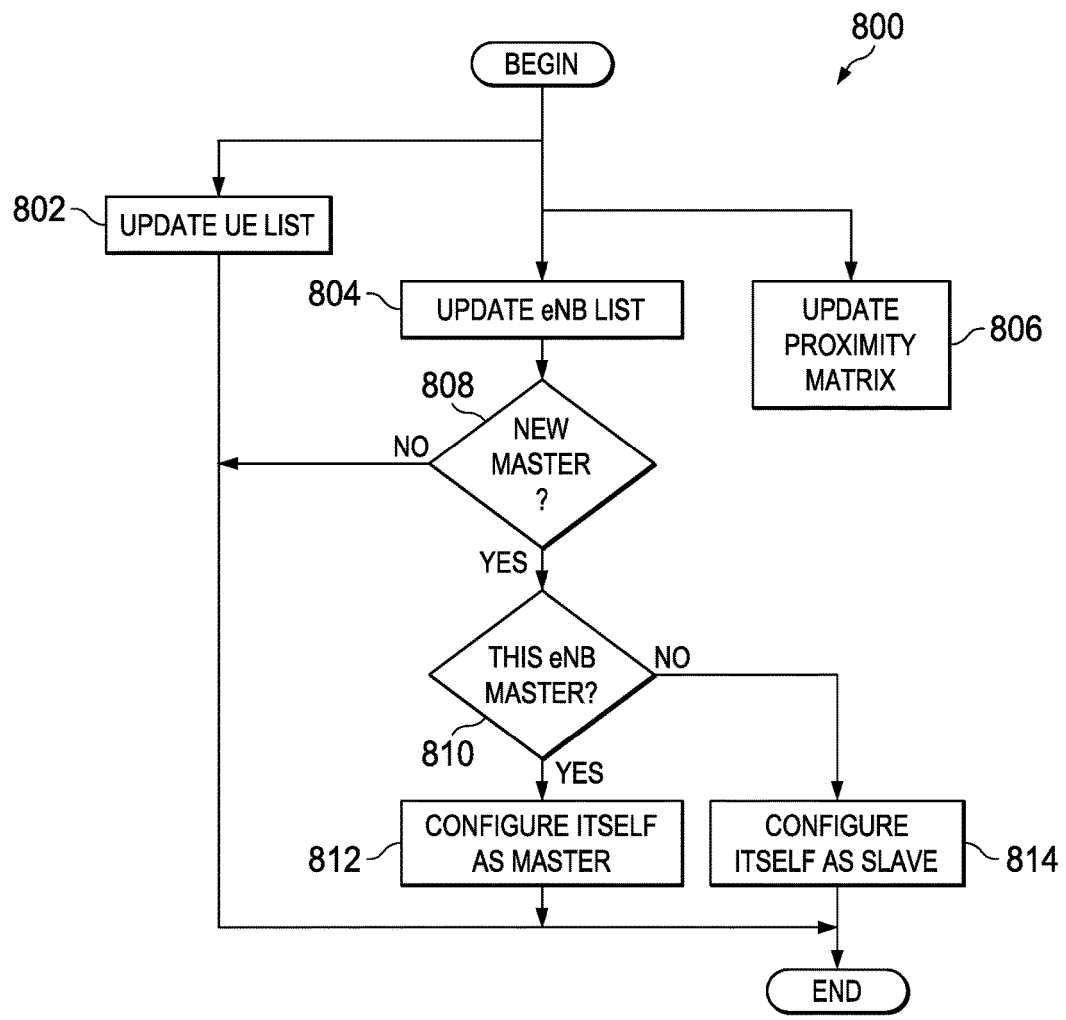
FIG. 8 is a flowchart illustrating an embodiment of a method of a high level description of the "D2D mode" state.

The "D2D Mode" State is the state where the eNB is involved in at least one D2D transmission. The high level description of the "D2D mode" state is shown in FIG. 8. Based on the event received, a specific process is triggered.

Various trigger events are shown in the table below:

| Event | Generating entity | Action (update) | Signaling |
|---|---|---|---|
| Receive Group Info | proximity server | D2D group ID, UE & eNB list of group, master eNB ID, proximity matrix | |
| Time over C1 Threshold | (master) eNB | Resource allocation based on BSR reports (& long-term D2D channel info) includes terminating D2D communications if all BSR empty | |

| Event | Generating entity | Action (update) | Signaling |
|---|---|---|---|
| UE Reporting Loss of D2D Link (D2D RLF) | UE | Support D2D communication via cellular links | UE report: RRC, MAC CE, a-periodic CSI (using SR) |
| Others (HO, no D2D transmission/ switch UE 2 cellular commands) | | | |

The "Receive Group Info" Event is the one triggering the D2D mode. After receiving it from the proximity server, the eNB updates the D2D communication group information.

The message received from the proximity server contains the following:
D2D group ID,
The list of UEs member of the group,
A list of eNBs corresponding to the serving eNBs of the UEs member of the group.
The master eNB identity: when there is more than one eNB serving the UEs, one eNB acts as the master controller and manages the group, and
The proximity information, which indicates which UEs are in proximity; if there are N UEs in the group, the proximity information can be viewed as an N×N matrix of ones and zeroes, with ones indicating that two UEs are in proximity (or vice versa).

The "Update group info" process is shown in FIG. 8. The eNB updates the list of UEs, the list of eNBs, and the proximity information. It also checks who the eNB master ID is. If it is the master, it configures itself as such. The master determination is done by the proximity server and is up to the implementation. In this section, the assumption is that the network is synchronized. FIG. 8 is a flowchart illustrating an embodiment of a method 800 of a high level description of the "D2D mode" state. The processes 802, 804, 806 may be performed simultaneously or individually. The particular order that processes 802, 804, and 806 are executed may vary by implementation. At block 802 the eNB updates the UE list, after which, the method 800 ends. At block 804 the eNB updates the eNB list and then proceeds to block 808 where the eNB determines if a new master eNB has been indicated. If no, then the method 800 ends. If yes, then the method 800 proceeds to block 810 where the eNB determines whether the eNB is itself the new master. If yes, then the method 800 proceeds to block 812 where the eNB configures itself as the master, after which, the method 800 ends. If no, then the method 800 proceeds to block 814 where the eNB configures itself as a slave, after which, the method 800 ends. At block 806, the eNB updates the proximity matrix.

With respect to the "Time over C1 Threshold" Event, the eNB periodically checks whether a new resource allocation is needed. This is done using a timer $C_1$. This event triggers a resource allocation update. Note that the resource allocation can be orthogonal or non-orthogonal to UEs.

Figure 9:
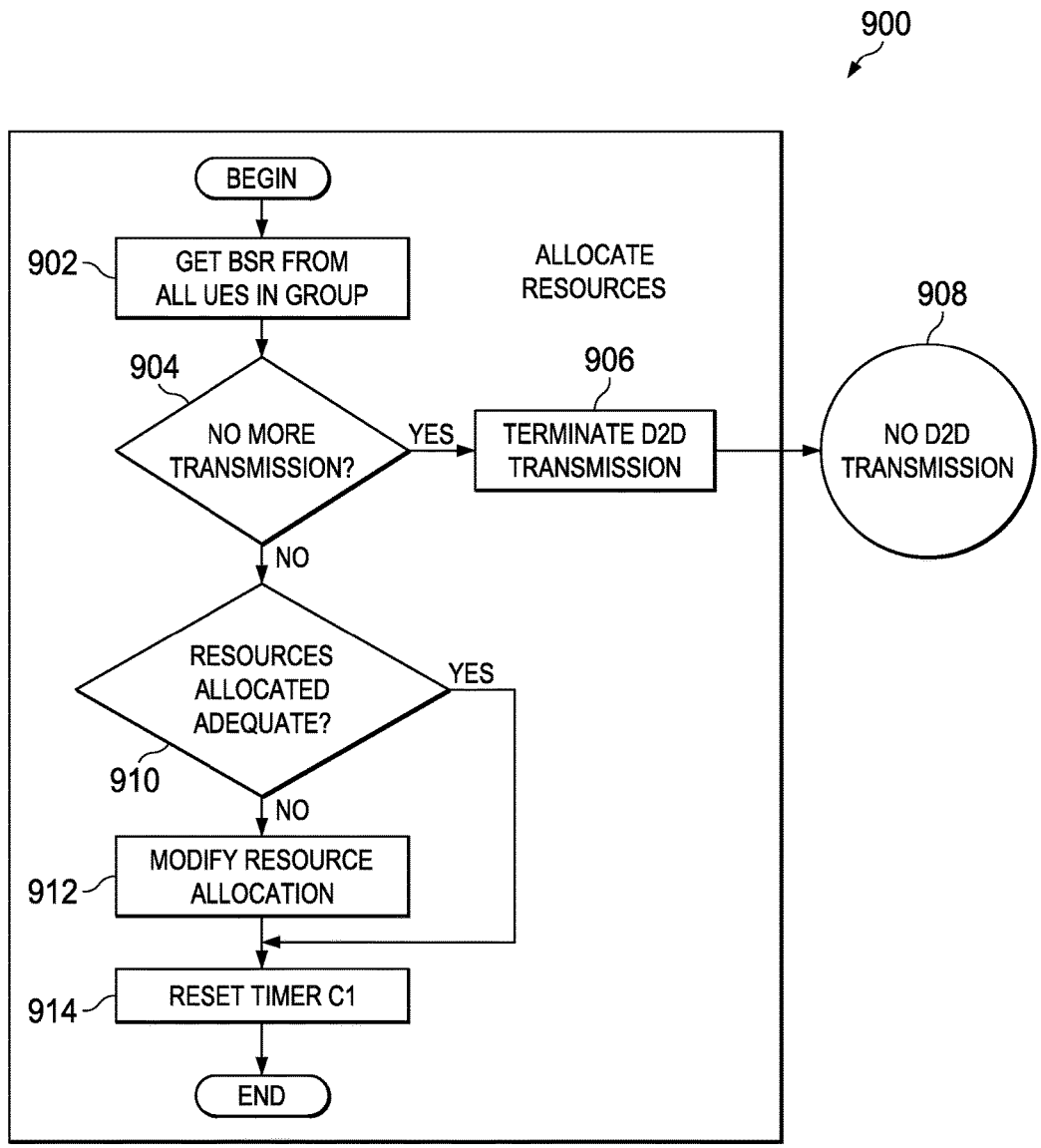
FIG. 9 is a flowchart of an embodiment of a method for an "Allocate Resources" process that is under the control of the master eNB.

FIG. 9 is a flowchart of an embodiment of a method 900 for an "Allocate Resources" process that is under the control of the master eNB. The method 900 begins at block 902 where the master eNB receives BSR from all UEs in the group. At block 904, the master eNB determines whether there are no more transmissions. If, at block 904, the answer is yes that there are no more transmissions, then the method 900 proceeds to block 906 where the master eNB terminates D2D transmission and then the method 900 proceeds to block 908 where the master eNB transitions to "No D2D transmission mode" state. If, at block 904 the answer is no and there are more transmissions, then the method 900 proceeds to block 910 where the master eNB determines whether the allocated resources are adequate. If the allocated resources are not adequate, then the method 900 proceeds to block 912 where the master eNB modifies the resource allocation and then, the method 900 proceeds to block 914 where the master eNB resets the timer, C1, after which, the method ends. If the allocated resources are adequate, the method 900 proceeds to block 914 where the master eNB resets the timer, C1, after which, the method ends.

Method 900 relies on getting a Buffer Status Report (BSR) from all UEs in the group. If all buffers are empty, the D2D transmission is terminated. If not, and if the resources allocated are not adequate, the resource allocation is modified. The assumption here is that only one flow is handled. If there are multiple flows, the solution is slightly adapted.

To assist proper resource allocation, the network may need some information regarding the quality of D2D links. The information can be long-term information, similar to RSRP or RSRQ reports.

In LTE, for non-DRX and intra-frequency case, the measurement period is 200 ms. In case of D2D communications, since not all subframes are used for D2D and more importantly not for a particular D2D UE, either measurement period may need to be longer or more frequency resources may be required to get a good channel estimate of a D2D link. The measurement period may depend on the number of resources allocated to D2D communications as well as number of group members. The measurement period may be signaled to group members, e.g., by means of higher layer signaling.

Each D2D UE may transmit the worst D2D link quality it has to other group members or a set of link qualities to the network. For the latter, members of the group should be assigned a number inside a group, and the numbering should be signaled to all UEs. The reports can be triggered by the network or can be sent to the network periodically. In the case where the D2D group involves multiple eNBs, each UE reports to its own eNB and eNBs may send a function of the information to the master eNB. The report may be triggered when a BSR report is transmitted or a UE may be configured to send such a report in relation to the time that it sends a BSR report.

In cellular communications, BSR is used at the scheduler for the purpose of allocating UL resources to UEs, and is transmitted as MAC control element as described in section 5.4.5 in [8]. For D2D communications, all data can be considered as UL from the network point of view.

Figure 10:
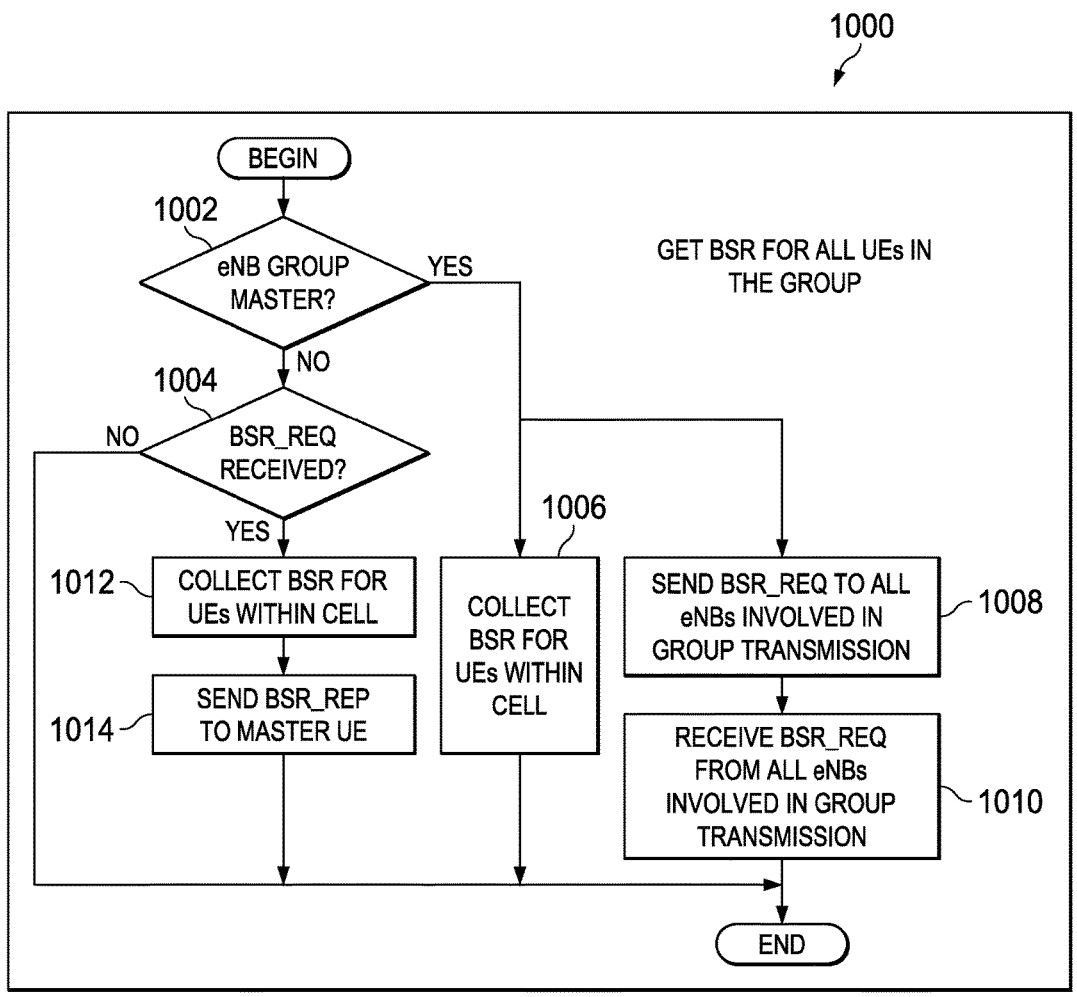
FIG. 10 is a flowchart illustrating an embodiment of a method for obtaining BSRs.

FIG. 10 is a flowchart illustrating an embodiment of a method 1000 for obtaining BSRs. The method 1000 begins at block 1002 where the eNB determines if it is the group master. If the eNB is the group master, it does two things: collect the BSRs for all the UEs it is serving in block 1006, and send a BSR request to all eNBs involved in the group transmission at block 1008. At block 1010, the eNB receives the BSR_REP (buffer status report) from all eNBs involved in group transmissions. Once it has received the BSRs from all eNBs involved in the group transmission as well as the BSRs from the UEs it serves, it has all the BSR information to modify the resource allocation if necessary.

If the eNB is a slave, the method proceeds to block 1004 and determines whether it has received the BSR_REQ from the master. If not, then the method 1000 ends. If yes, then once it receives the BSR_REQ from the master, the eNB proceeds to block 1012 where it collects the BSRs for all the UEs within the cell, collates the BSRs and then the method proceeds to block 1014 where the eNB sends the BSR_REP back to the master, after which, the method 1000 ends. The D2D BSR format may reuse the existing cellular BSR format, or a simplified format may be used given the characteristics of D2D data. For example, instead of three types of BSRs (long, short and truncated) defined for cellular BSR, one type may be sufficient for D2D BSR, especially if all D2D data of the same UE group requires similar level of QoS.

The master eNB can use a new X2 signaling to send BSR_REQ to its neighbor eNBs for each group it manages. Then the neighbor eNBs using a new X2 signaling can report back the collated BSR report for each group in response to each BSR_REQ sent by the corresponding master eNB if the neighbor eNB is a slave eNB in the group communication. Slave eNBs may also transmit additional information such as their cellular BSR or the maximum number/the time-frequency location of resources they can allocate to the D2D group communication. The X2 signaling used by the slave eNB to report collected D2D BSRs to master eNB can be tailored to D2D needs.

Figure 11:
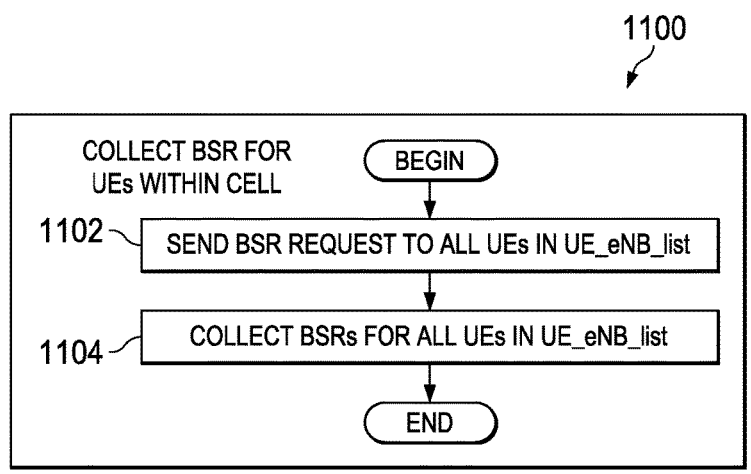
FIG. 11 is a flowchart illustrating an embodiment of a method for a "collect BSR for UEs within cell" process by polling.

FIG. 11 is a flowchart illustrating an embodiment of a method 1100 for a "collect BSR for UEs within cell" process by polling. The method 1100 begins at block 1102 where the eNB sends a BSR request to all the UEs in the UE_eNB_list. The method 1100 then proceeds to block 1104 where the eNB collects the BSRs for all UEs in the UE_eNB_list. As described, the eNB polls the UEs to get the BSR. The polling of eNB may be indicated through a new MAC CE by defining a designated Logical Channel ID (LCID) for the polling MAC CE. The eNB may also set a designated poll bit in one of the MAC subheaders, in order to notify UE to report D2D BSR. Note that currently there is no poll bit defined in the current LTE MAC subheaders yet. However, there are reserved bits ('R' bit) in MAC subheader available, and at least one 'R' bit may be used for polling purpose.

There is another trigger of BSR in the current LTE system: arrival of new data with higher priority. So in D2D setup, this may trigger a BSR report. In the case where the UE belongs to a slave eNB, the slave eNB notifies the master eNB about the BSR report, if master eNB manages the resource allocation. Another solution is to have UEs periodically reporting their BSR. In another embodiment, generating the BSR is triggered by an expiry of a retransmission D2D BSR timer and the amount of D2D data available being greater than zero.

In [4], two timers for BSR reporting are defined for LTE cellular communications: periodicBSR-Timer and retxBSR-Timer. A BSR shall be triggered if either of the timers expires. The periodicBSR-Timer may be used to ensure that a BSR is transmitted at least once in a period. The retxBSR-Timer may be used to avoid the case that eNB has not received the BSR report sent by the UE and the UE has mistakenly decoded an ACK instead of NACK in response to its BSR report transmission. The retxBSR timer is restarted whenever an uplink grant is received; if no uplink grant is received before the timer expires, the UE retransmits the BSR.

For D2D, the D2D BSR should be distinguishable from cellular BSR. Two additional timers (referred to as periodicD2DBSR-Timer and retxD2DBSR-Timer) for D2D BSR report are used. It is noted that periodicD2DBSR-Timer and periodicBSR-Timer can be the same. The maximum expiration time of the timers may be the same or different for cellular and D2D.

Similar to retxBSR-Timer for cellular BSR, the retxD2DBSR-Timer can be restarted whenever a D2D resource grant is received. However, in the case of D2D, a D2D resource grant is to be used by all group members. Therefore, receiving such a grant does not necessarily warrant the eNB had received the BSR of each group member correctly. To remedy this scenario, another embodiment of retxD2DBSR-Timer operation may be: the acknowledgment sent by eNB can be repeated multiple times, and the UE upon reception of a certain number (the number can be configurable or written in the specifications) of ACKs sent by eNB, restarts its retxD2DBSR timer; otherwise the UE will retransmit the D2D BSR. The D2D BSR can be transmitted as a new MAC control element. Alternatively, the D2D-BSR can be reported via RRC signaling.

In the case where a UE belongs to more than one group, the BSR reports can be combined in up to four logical groups as is done in current LTE systems. It may be desirable to have each UE send each D2D BSR for each group it belongs to in a distinguishable manner. For instance, the UE can have a retxD2DBSR-Timer for each group it belongs to.

In the case where eNB assigns UE-specific D2D resource allocation for group communication, the existing LTE BSR reporting mechanism can be used. Even without UE-specific D2D resource allocation, still it is possible to reuse the existing LTE BSR reporting mechanism. However, at least the cellular and D2D BSRs should be distinguishable and the retxBSR-Timer and retxD2DBSR-Timer needs to be different.

Figure 12:
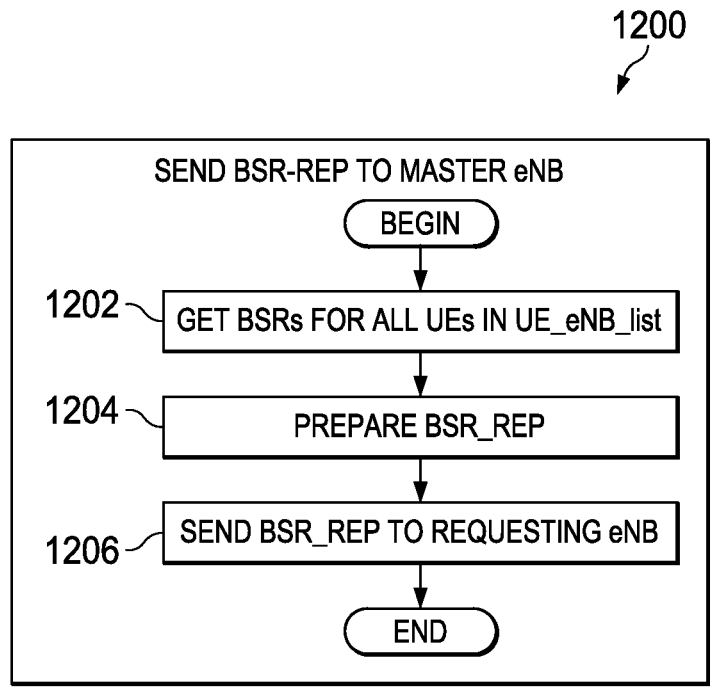
FIG. 12 is a flowchart illustrating an embodiment of a method for a "send BSR_REP to master eNB" process.

FIG. 12 is a flowchart illustrating an embodiment of a method 1200 for a "send BSR_REP to master eNB" process. The method 1200 begins in block 1202 where the eNB gets the BSRs for all UEs in the UE_eNB_list. At block 1204, the eNB prepares the BSR_REP and at block 1206, the eNB sends the BSR_REP to the requesting eNB, after which, the method 1200 ends.

Figure 13A:
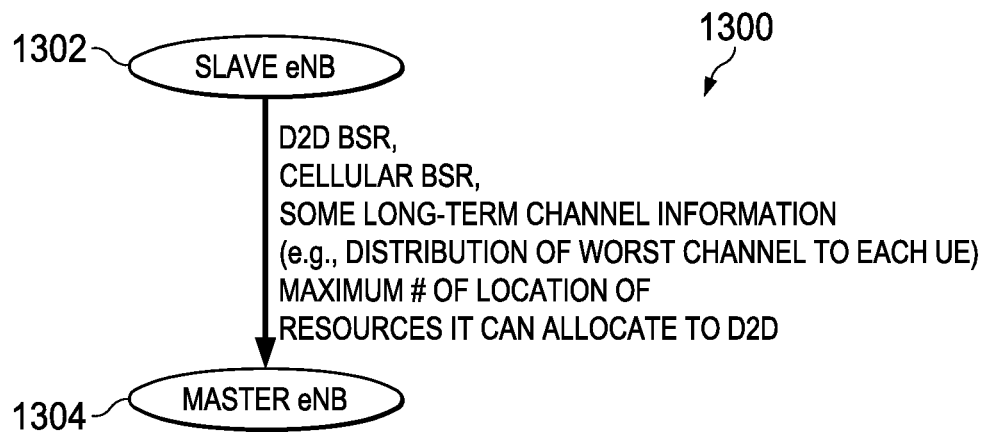
FIG. 13A illustrates an embodiment system for intercell communication for a resource allocation update.

FIG. 13A illustrates an embodiment system 1300 for intercell communication for a resource allocation update. The system 1300 includes a slave eNB 1302 and a master eNB 1304. The slave eNB sends D2D BSR, cellular BSR, some long-term channel information (e.g., distribution of worst channel to each UE), and the maximum number or location of resources it can allocate to D2D to the master eNB 1304.

Figure 13B:
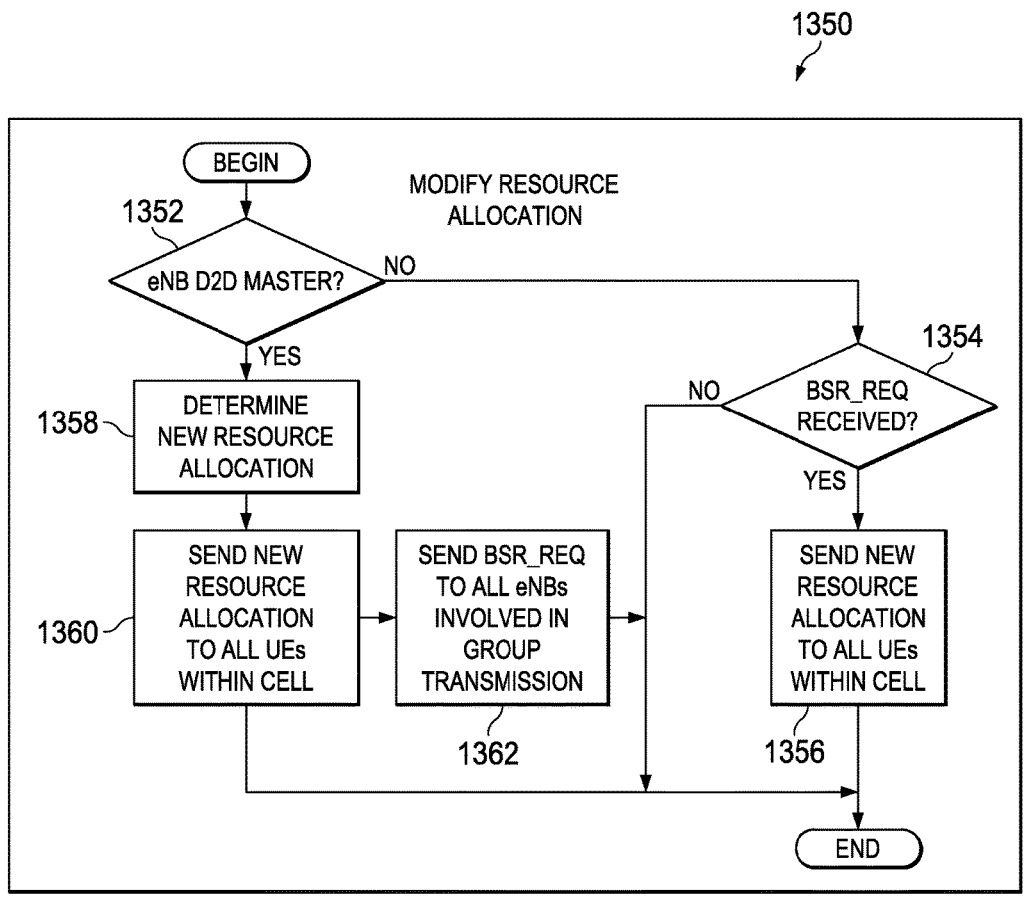
FIG. 13B illustrates an embodiment of a method for a "Modify Resource Allocation" process.

FIG. 13B illustrates an embodiment of a method 1350 for a "Modify Resource Allocation" process. The method 1350 begins at block 1352 where the eNB determines if it is the master. If it is the master, the method 1350 proceeds to block 1358 where the eNB determines new resource allocation. At block 1360, the eNB sends the new resource allocation to all UEs within the cell, after which, the method 1350 may end or may proceed to block 1362. At block 1362, the eNB sends the BSR-REQ to all eNBs involved in group transmission, after which the method 1350 ends. If, at block 1352, the eNB determines that it is not the master, the method 1350 proceeds to block 1354 where the eNB determines if a BSR-REQ has been received. If no BSR_REQ has been received, the method 1350 ends. If the BSR_REQ has been received, then the eNB sends the new resource allocation to all UEs within the cell, after which, the method 1350 ends.

The processing in method 1350 differs if the eNB is a master or not. If the eNB is a master, it determines the new resource allocation. It then sends it to all the UEs it is serving, and also informs all the other eNBs involved in the group transmission so that they can notify their UEs of the new resource allocation. Each eNB may use RRC signaling and/or other control PDUs/messages to send the modified resource information to its UE for each group. For example, the network may configure D2D UEs with a list of candidate resource allocation patterns in advance through RRC signaling, with assigned identification scheme, e.g., index value. During the D2D communication process, eNB may further select one resource allocation pattern to be used in the following N number of subframes. The selection can be made through indication of index value in MAC control element, for example.

With respect to the "Terminate D2D Transmission" process, the network may decide to terminate D2D transmission under certain conditions. For example, when all the BSRs come back as empty, i.e., no further data to be transmitted, it is time to terminate the D2D group communication. This process is quite similar to the "modify resource allocation" one.

FIG. 14 is a flowchart illustrating an embodiment of a method 1400 for terminating D2D transmission. The method 1400 begins at block 1402, where the eNB determines if it is the eNB D2D master. If the eNB is not the eNB D2D master, the method 1400 proceeds to block 1404 where the eNB determines whether a termination message has been received. If no termination message has been received, the method 1400 ends. If, at block 1404, the eNB determines that a termination message has been received, then the method 1400 proceeds to block 1406 where the eNB terminates all links with UEs within the cell, after which, the method 1400 ends. If, at block 1402, the eNB determines that it is the eNB D2D master, then the method 1400 proceeds to block 1408 where the eNB sends a termination message to all eNBs involved in group transmission. At block 1410, the eNB terminates all links with UEs within the cell and at block 1412, the eNB releases the D2D group ID, after which, the method 1400 ends.

New RRC signaling can be used. Alternatively, the PDCCH order (shown in DCI format 1A) can be reused as described in "Command to Switch to No D2D Transmission" event below.

FIG. 15 is a flowchart of an embodiment of a method 1500 to terminate all links with UEs within cell. The method 1500 begins at block 1502 where a termination message is sent to all UEs in the UE_eNB_list. At block 1504, the cellular RRC connection that was maintained is closed, after which, the method 1500 ends.

FIG. 16 is a flowchart of an embodiment of a method 1600 for releasing a D2D group ID. The method 1600 begins at block 1602 where the eNB notifies the proximity server of termination of the communication, after which the method 1600 ends. Note that this D2D ID is the group ID, not the individual D2D ID.

With respect to the "UE Reporting Loss of D2D Link" event, when the UE experiences unsatisfactory D2D link condition, it reports it to the eNB. Two cases are considered:
  If the group is set up for direct mode only, if one D2D link is broken, the entire D2D group communication needs to stop. The eNB reports the loss of the D2D link to the proximity server so that it can terminate the D2D communication. Alternatively, a group could be just best effort direct mode only, where only the UEs that can listen would listen.
  If the group is "hybrid," with cellular links and D2D links for the D2D group communication, the eNB switches the broken D2D link to cellular. All the links involving this UE are switched to cellular.

For evaluating the D2D link condition, the radio link monitoring (RLM) technique used in LTE can be reused. RLM is a measurement function for ensuring that UEs maintain time-synchronization and can receive their control information reliably. In 3GPP-LTE, UEs evaluate the quality of the serving cell eNodeB downlink continuously and ensure that they are time-synchronized to the serving cell eNodeB. RLM monitoring comprises out-of-synchronization (OOS) and in-synchronization (IS) evaluation procedures where UE monitors cell-specific reference signal (CRS) quality of the serving cell in the presence of co-channel interference. OOS and IS are defined as events that the block error rates of hypothetical PDCCH transmissions corresponding to a pre-determined control payloads exceed pre-specified thresholds [9].

Figure 17A:
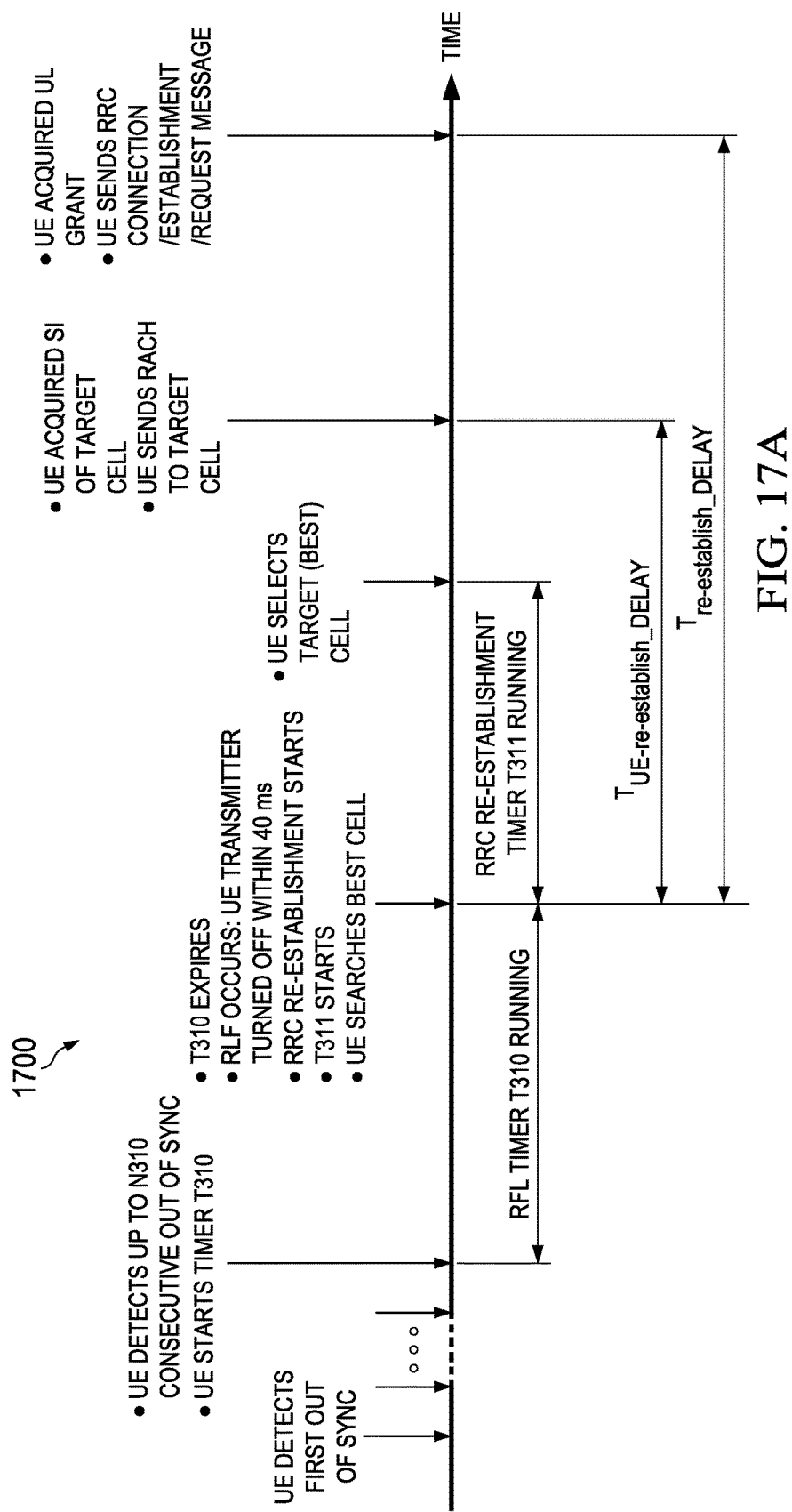
FIG. 17A is a timing diagram that shows the different states in cellular RLM.

FIG. 17A is a timing diagram 1700 that shows the different states in cellular RLM.

According to [5], in LTE, the downlink radio link quality of the primary cell shall be monitored by the UE for the purpose of indicating out-of-sync/in-sync status to higher layers. If higher-layer signaling indicates certain subframes for restricted radio link monitoring, the radio link quality shall not be monitored in any subframe other than those indicated.

According to [6], when the downlink radio link quality of the PCell estimated over the last 200 ms period becomes worse than the threshold Qout, Layer 1 of the UE shall send an out-of-sync indication for the PCell to the higher layers within 200 ms Qout evaluation period. A Layer 3 filter shall be applied to the out-of-sync indications as specified in [7]. Further, when the downlink radio link quality of the PCell estimated over the last 100 ms period becomes better than the threshold Qin, Layer 1 of the UE shall send an in-sync indication for the PCell to the higher layers within 100 ms Qin evaluation period. A L3 filter shall be applied to the in-sync indications as specified in [7]. The transmitter power of the UE shall be turned off within 40 ms after expiry of T310 timer as specified in clause 5.3.11 in [7].

In case of D2D group communication, the two roles of RLM can be discussed separately: maintaining time-synchronization, and reliably receiving control information.

In D2D group communication, time-synchronization source may be different than the entity sending control information. For example, eNB may provide the time-synchronization whereas the transmitting D2D UE may send the control information. The same RLM procedure as cellular is sufficient to provide the time-synchronization. However, a new RLM mechanism is used to ensure reliable control information, and D2D link quality, which is referred to as D2D_RLM.

D2D_RLM is performed for every D2D link at each UE receiver. For example, if a D2D group is composed of UE1, . . . , UEM, then each UE in the group needs to have a D2D_RLM for every other UE (M−1 at most). All UEs only perform RLM for each UE whenever it transmits. Therefore, D2D-RLM measurements are valid for specific D2D subframes among subframes allocated for D2D communication wherein a single UE is transmitting. In cellular operation, subframes for restricted radio link monitoring are signalled to a UE by higher layer signalling. However, D2D-RLM can be performed for all D2D subframes, but there are different RLM measurements associated to different UEs transmitting. The UEs need to know when to perform RLM for each transmitting UE. This information can be conveyed to UEs by eNB through RRC signaling. For instance, eNB can inform the UEs in a group that D2D subframe indices 1-10 allocated to one UE transmission and D2D subframe indices 11-20 allocated to another, etc. To have reliable understanding about the links, still measurements can be done over 200 ms evaluation period for Qout and 100 ms evaluation period for Qin. However, these 100/200 ms may be distributed over time.

The D2D-RLM parameters may be the same or different than cellular RLM. For instance, D2D-RLM may use different Qout/Qin thresholds than cellular. It is also possible to have different evaluation periods for D2D-RLM than cellular RLM. Additional timers should be defined for D2D-RLM. As opposed to cellular RLM, the transmitter power of the UE is not turned off within 40 ms after expiry of D2D-T310 timer; instead it can send a D2D-RLF (radio link failure) report to the network. The UE can send a report conveying the following information:

D2D-ID of UEs at the other side of the failed links;
An indication of the resource set it observed the RLF (e.g., one resource set belonging to a single transmitter can be the subframes that satisfy a formula, like subframe number modulo Z is 8); and
information pertaining the last packet sent including which reliability version sent.

Figure 17B:
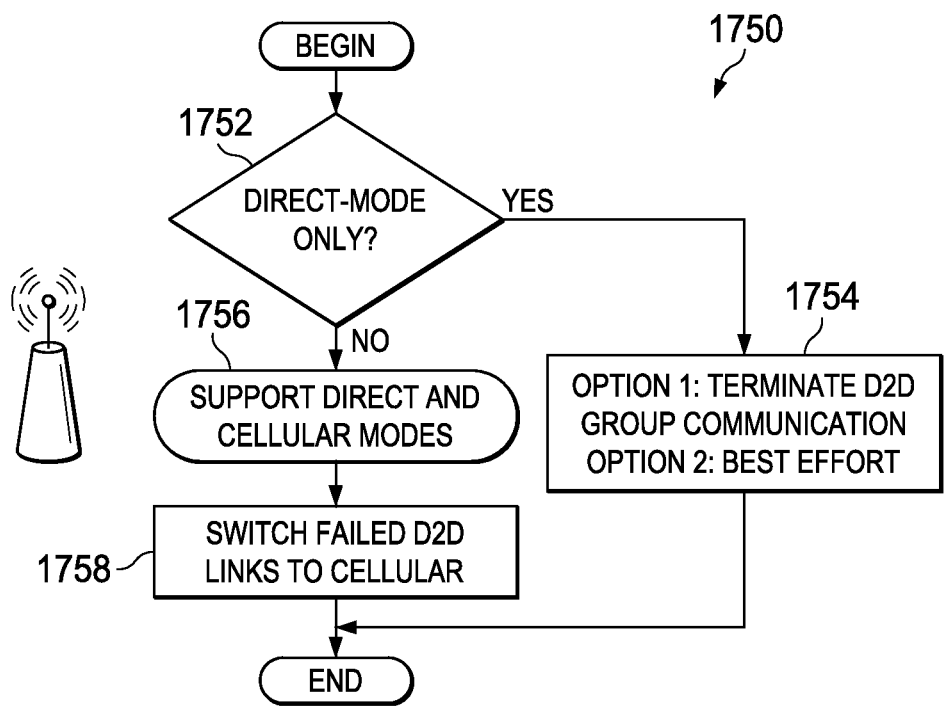
FIG. 17B is a flowchart of an embodiment of a method for D2D RLF processing when a UE experiences an unsatisfactory D2D link, and reports to eNB.

FIG. 17B is a flowchart of an embodiment of a method 1750 for D2D RLF processing when a UE experiences an unsatisfactory D2D link, and reports to eNB. The method 1750 begins in block 1752 where the eNB determines if the UE is direct-mode only. If the UE is not direct-mode only, the method 1752 proceeds to block 1756 where the eNB determines that the UE supports direct and cellular modes. At block 1758, the eNB switches the failed D2D links to cellular, after which, the method 1750 ends. If, at block 1752, the eNB determines that the UE supports direct-mode only, then the method 1750 proceeds to block 1754 where the eNB selects from one of two options: option 1 or option 2. If option 1 is selected, then the D2D group communication is terminated. If option 2 is selected, then the UE is instructed to make due with a best effort. After completing block 1754, the method 1750 ends.

In case a UE measures RLF for more than one link, it may use one or multiple signals to inform the network.

There are several ways to report D2D-RLF. First, use new RRC signalling, but that may take some time. Second, the UE can use new MAC control element signalling to indicate there is a D2D-RLF.

Third, the UE can reuse a-periodic CSI report in PUSCH. In cellular communication, eNB is the entity triggering the a-periodic CSI report. But here, the UE is the entity which initiates the report, so a new mechanism is required for reusing the a-periodic CSI report. One way is to use scheduling request (SR).

The UE reuses SR to inform eNB about the D2D link failure. To let eNB distinguish the regular SR from a D2D-RLF SR, the D2D-RLF SR is masked by D2D group RNTI. In addition, to ensure that the eNB gets the D2D-RLF SR, it may be repeated, and the number of repetitions may be signaled by a broadcast message or may be specified in the 3GPP specifications.

Upon reception of the D2D-RLF SR, the eNB may trigger a report, by a request in a DCI message for uplink transmissions masked by D2D-RNTI of the UE (or by UE-ID) which sent the D2D-RLF SR.

The DCI message is sent in the UE-specific search space.
After transmission of D2D-RLF SR, the UE monitors its UE-specific PDCCH region.

The report can be masked by D2D group RNTI.

With respect to the "One UE Hands off" event, if one or more UE hands off, the eNB notifies the proximity server so that it can update the group information. S1 signaling can be used for such a purpose.

With respect to the "Command to Switch to No D2D Transmission" event, if such a message is received from the proximity server, the eNB switches all the UEs in the group to the cellular link.

One possibility is to use RRC signaling. Also, a new DCI sent in PDCCH common search space masked by group-RNTI can be used. Alternatively, PDCCH order can be utilized.

In cellular communication, PDCCH order can be used to trigger contention-free RACH transmission and includes a 6-bit RACH preamble index as well as a 4-bit PRACH mask index. The mask index is used to identify which PRACH resources, out of the ones indicated by PRACH configuration, the UE is allowed to use for RACH operation.

The 10 bits (6-bit RACH preamble index as well as a 4-bit PRACH mask) can be reused to indicate different D2D orders, one of which is "no D2D transmission" command. The CRC of D2D-PDCCH order can be scrambled with group RNTI.

With respect to the "Command to Switch UE to Cellular" event, if such a message is received from the proximity server, the eNB switches that particular UE to the cellular link. PDCCH order as described above or RRC signaling can be used.

The proximity server performs all the operations to maintain the proximity information and the group communication.

Figure 18:
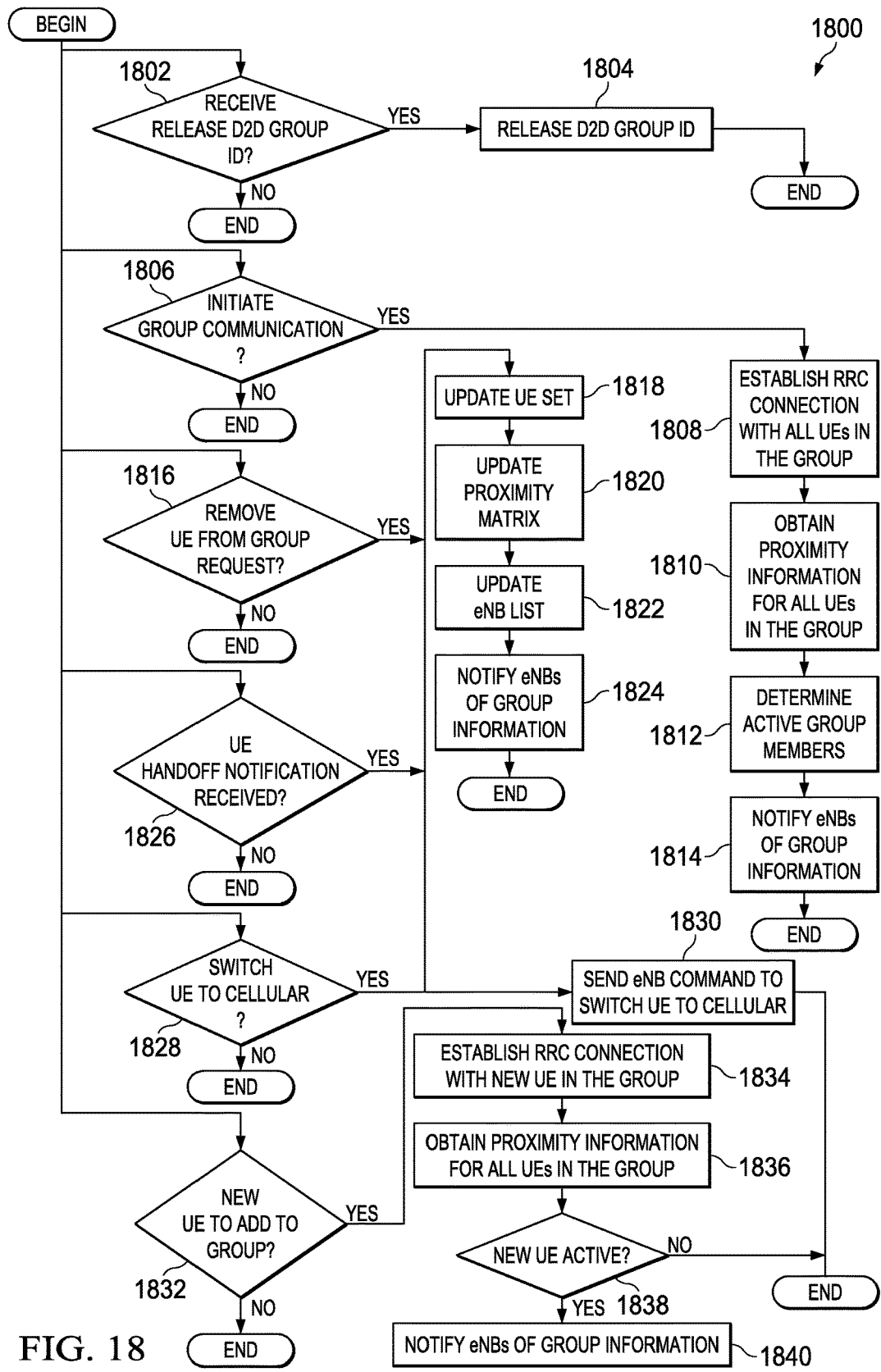
FIG. 18 is a flowchart of an embodiment method of the high level processing of the proximity server.

FIG. 18 is a flowchart of an embodiment method 1800 of the high level processing of the proximity server. The method 1800 can begin in either block 1802, 1806, 1816, 1826, 1828, or 1832. The processes started by each of blocks 1802, 1806, 1816, 1826, 1828, or 1832 may all be performed simultaneously or in any arbitrary order. In some embodiments, not all of the processes started by each of blocks 1802, 1806, 1816, 1826, 1828, or 1832 are executed, but only those that are triggered or are necessary at a particular time.

At block 1802, the proximity server determines whether it has received a release D2D group ID. If no, then the method 1800 may end. If yes, then the method 1800 proceeds to block 1804 where the proximity server releases the D2D group ID, after which, the method may end.

At block 1806, the proximity server determines whether it has received an indication to initiate group communication. If no, then the method 1800 may end. If yes, then the method 1800 proceeds to block 1808 where the proximity server establishes an RRC connection with all UEs in the group. At block 1810, the proximity server obtains proximity information for all UEs in the group. At block 1812, the proximity server determines the active group members. At block 1814, the proximity server notifies the eNBs of the group information, after which, the method 1800 may end.

At block 1816, the proximity server determines whether it has received a request to remove a UE from the group. If no, then the method 1800 may end. If yes, then the method 1800 proceeds to block 1818 where the proximity server updates the UE list. At block 1820, the proximity server updates the proximity matrix. At block 1822, the proximity server updates the eNB list and at block 1824, the proximity server notifies the eNBs of the group information, after which, the method 1800 may end.

At block 1826, the proximity server determines whether it has received a UE handoff notification. If no, then the method 1800 may end. If yes, then the method 1800 proceeds to block 1818 and proceeds as described above.

At block 1828, the proximity server determines whether to switch a UE to cellular. If it is determined that the UE will not be switched to cellular, then the method 1800 may end. If the proximity server determines that the UE should be switched to cellular, then the method 1800 proceeds to both block 1818 and to block 1830. The processes beginning at block 1818 continue as described above. At block 1830, the proximity server sends an eNB a command to switch the UE to cellular, after which, the method 1800 may end.

At block 1832, the proximity server determines whether to add a new UE to the group. If a new UE is not added to the group, then the method 1800 may end. If the proximity server determines that a new UE is to be added to the group, then the method 1800 proceeds to block 1834 where the proximity server establishes an RRC connection with the new UE in the group. At block 1836, the proximity server obtains proximity information for all UEs in the group. At block 1838, the proximity server determines if the new UE is active. If not, then the method 1800 may end. If yes, then the method 1800 proceeds to block 1840 where the proximity server notifies the eNBs of the group information, after which, the method 1800 may end.

With respect to the "Receive Release D2D Group ID" event, an eNB may send this command when the D2D group communication is over. The proximity server simply releases the D2D group ID. The master eNB may use S1 signaling for informing the proximity server.

With respect to the "Initiate Group Communication" event, when the proximity server has to initiate a group communication, the first task to do is to initiate a RRC connection with all the UEs within the group. This RRC connection is used for controlling the group as well as a backup in case the D2D link is broken. The proximity server also obtains the ID of all eNBs involved for the D2D group communication.

Figure 19:
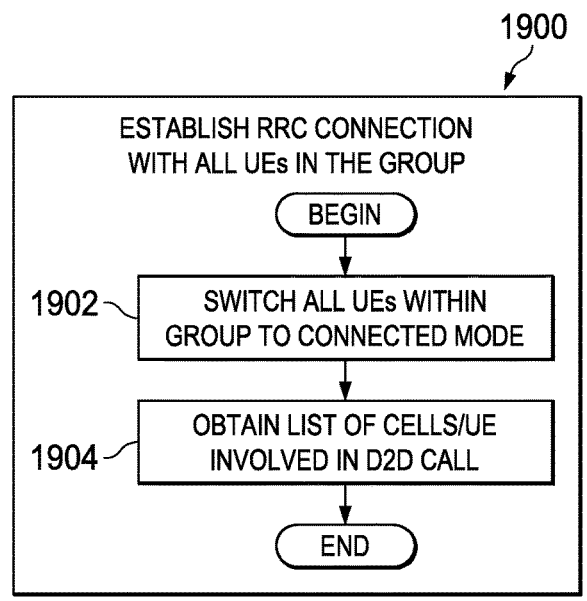
FIG. 19 is a flowchart illustrating an embodiment of a method for establishing an RRC connection with all UEs in the group.

FIG. 19 is a flowchart illustrating an embodiment of a method 1900 for establishing an RRC connection with all UEs in the group. The method 1900 begins at block 1902 where the proximity server switches all UEs within the group to connected mode. At block 1904, the proximity server obtains a list of cells (i.e., eNBs) and UEs involved in the D2D call, after which, the method 1900 ends.

With respect to the "Obtain Proximity Information for all UEs in the Group" process, once all the UEs are in connected mode, the proximity server obtains the proximity information for all the UEs in the group.

Figure 20:
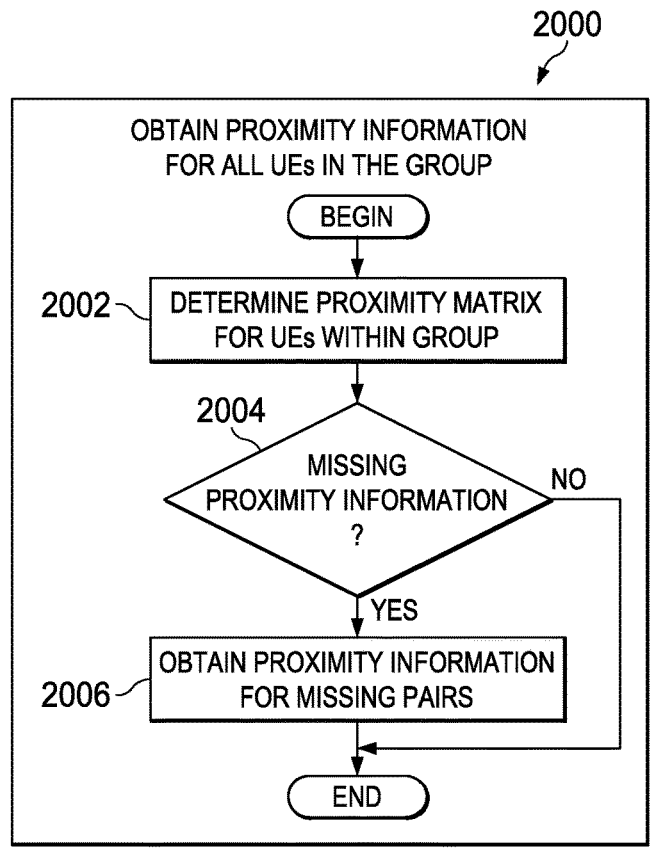
FIG. 20 is a flowchart illustrating an embodiment method for obtaining proximity information for all UEs in the group.

FIG. 20 is a flowchart illustrating an embodiment method 2000 for obtaining proximity information for all UEs in the group. The method 2000 begins at block 2002 where the proximity server establishes or determines the proximity matrix for the UEs within the group. At block 2004, the proximity server determines if it is missing any proximity information and, if it is not, then the method 2000 ends. If there is some missing proximity information, the method 2000 proceeds to block 2006 where the proximity server uses the "obtain proximity information for missing pairs" process to complete the proximity matrix, after which, the method 2000 ends. S1 signaling can be used to instruct the master eNB to get the proximity information for missing pairs. Then master eNB can use X2 signaling to inform the serving eNBs for UEs in the missing pairs, to perform type 2 discovery. Alternatively, the proximity server can use S1 signaling to instruct each serving eNB to initiate type 2 discovery for each missing pair. In other words, the proximity server directly communicates with the serving eNBs instead of talking to the master eNB.

Figure 21:
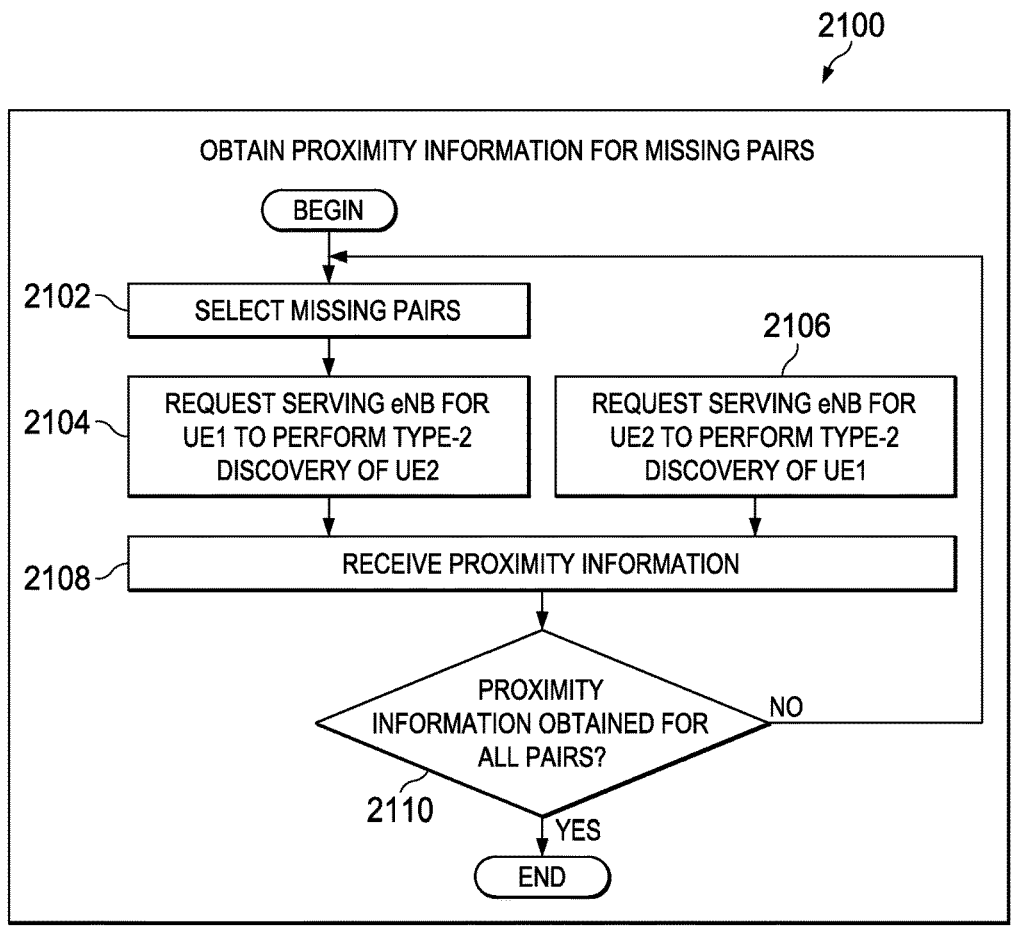
FIG. 21 is a flowchart illustrating an embodiment of a method for obtaining proximity information for missing pairs.

FIG. 21 is a flowchart illustrating an embodiment of a method 2100 for obtaining proximity information for missing pairs. It essentially includes of performing type-2 discovery for all the missing pairs. The method 2100 begins at block 2102 where the proximity server selects the missing pair. After block 2012, the method 2100 performs both block 2104 and block 2106. At block 2104, the proximity server requests that the serving eNB for UE1 to perform type-2 discovery of UE2 and at block 2106, the proximity server requests that the serving eNB for UE2 to perform type-2 discovery of UE1. After completion of blocks 2104 and 2106, the method proceeds to block 2108 where the proximity server receives proximity information from both the serving eNB for UE 1 and the serving eNB for UE2. At block 2110, the proximity server determines whether proximity information has been obtained for all pairs. If not, then the method 2100 proceeds to block 2102 where the process is repeated for another pair of UEs. If proximity information has been obtained for all pairs at block 2110, then the method 2100 ends.

With respect to the "Determine Active Group Members" process, once all the proximity information is obtained, the proximity server determines the UEs that are D2D active: all the UEs that are not in proximity of others are excluded, at least temporarily, from the D2D group communication, or are in communication with other group members through a cellular link.

Figure 22:
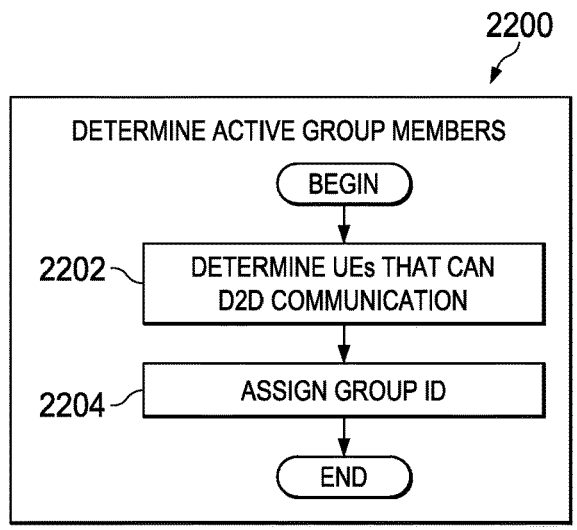
FIG. 22 is a flowchart of an embodiment of a method to determine the active UEs.

FIG. 22 is a flowchart of an embodiment of a method 2200 to determine the active UEs. The proximity server determines UEs that can be in direct communication based on the information passed by the eNB(s). The method 2200 begins at block 2202 where the proximity server determines the UEs that can perform D2D communication. At block 2204, the proximity server assigns a group ID to these UEs, after which, the method 2200 ends.

With respect to the "Notify eNBs of Group Information" process, the last stage of initiating a D2D group communication is to notify all the involved eNBs, so that they can organize the control for the D2D.

Figure 23:
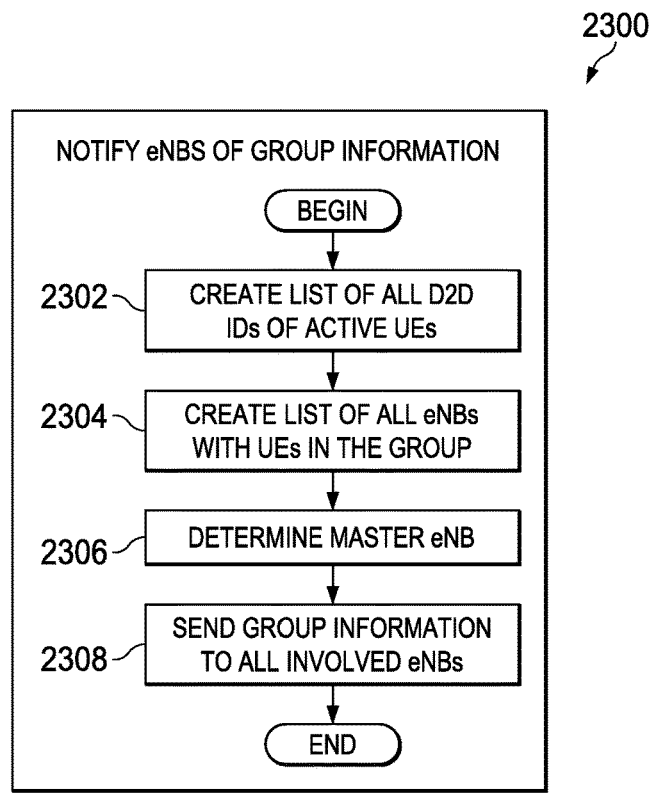
FIG. 23 is a flowchart of an embodiment of a method to notify eNBs of the group information.

FIG. 23 is a flowchart of an embodiment of a method 2300 to notify eNBs of the group information. The method 2300 includes getting all the UE IDs of the active D2D UEs, determining their serving eNBs, determining a group master, and notifying all the eNBs of the group information. The method 2300 begins at block 2302 where the proximity server creates a list of all D2D IDs of active UEs. At block 2304, the proximity server crates a list of all eNBs with UEs in the group. At block 2306, the proximity server determines the master eNB and, at block 2308, the proximity server sends the group information to all involved eNBs, after which, the method 2300 ends.

Figure 24:
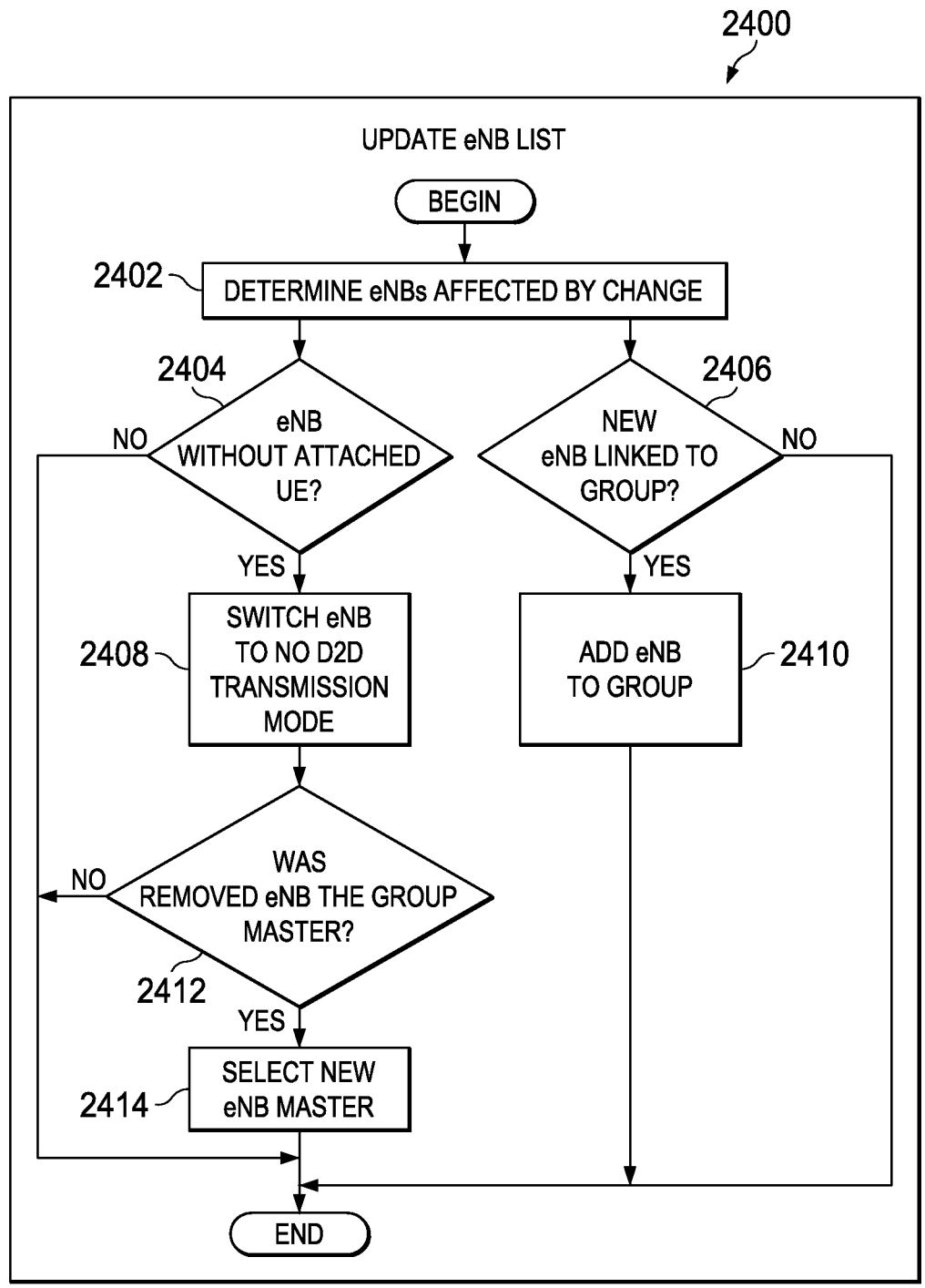
FIG. 24 is a flowchart of an embodiment of a method to update the eNB list.

With respect to the "Remove UE from Group Request" event, there are some cases where e.g. an eNB requests that a UE is removed from the group because it is no longer able to work in D2D mode. In order to remove a UE, the proximity server:

- Updates the UE list: the removed UE is removed from the group,
- Updates the proximity matrix: the proximity information is updated by removing all proximity information pertaining to the removed UE, and
- Updates the eNB list: this process is more involved, and is illustrated in FIG. 24. The proximity server determines if there are orphan eNBs. If yes, it switches them to "no D2D transmission" mode. If this eNB was the previous group master, a new master eNB is chosen. Similarly, if a new eNB is involved in the D2D communication, it is added to the group.

FIG. 24 is a flowchart of an embodiment of a method 2400 to update the eNB list. The method 2400 begins at block 2402 where the proximity server determines the eNBs affected by change. The method 2400 then proceeds to both block 2404 and block 2406. At block 2404, the proximity server determines if the eNB does not have an attached UE and, if no, the method 2400 ends and, if yes, the method 2400 proceeds to block 2408 where the proximity server switches the eNB to no D2D transmission mode. At block 2412, the proximity server determines whether the removed eNB was the group master and, if no, the method 2400 ends. If the removed eNB was the group master, then the method proceeds to block 2414 where the proximity server selects a new eNB master, after which, the method 2400 ends. At block 2406, the proximity server determines if there is a new eNB linked to the group and, if no, the method 2400 ends, and, if yes, the method 2400 proceeds to block 2410. At block 2410, the proximity server adds the eNB to the group, after which, the method 2400 ends.

Once all this group management is performed, the proximity server sends the updated group information to all involved UEs.

The processing of the "UE Handoff Notification Received" event is similar to the "Remove UE from group request" event.

The processing of the "Switch UE to Cellular Request" event is similar to the "Remove UE from group request" event. However, in addition, the proximity server sends to the serving eNB a command to switch the UE to cellular.

The processing of the "New UE to Add to Group" event is similar to the "initiate group communication" event processing, except that initially, it involves a single UE/eNB.

Figure 25:
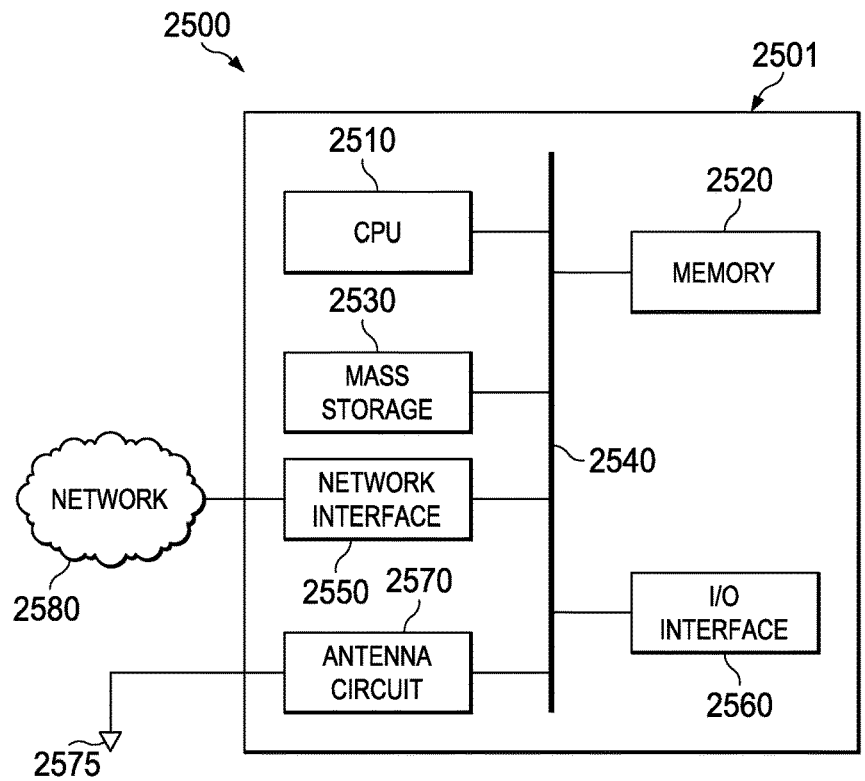
FIG. 25 is a block diagram of a processing system that may be used for implementing the devices and methods disclosed herein.

FIG. 25 is a block diagram of a processing system 2500 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 2500 may comprise a processing unit 2501 equipped with one or more input/output devices, such as a speaker, microphone, mouse, touchscreen, keypad, keyboard, printer, display, and the like. The processing unit 2501 may include a central processing unit (CPU) 2510, memory 2520, a mass storage device 2530, a network interface 2550, an I/O interface 2560, and an antenna circuit 2570 connected to a bus 2540. The processing unit 2501 also includes an antenna element 2575 connected to the antenna circuit.

The bus 2540 may be one or more of any type of several bus architectures including a memory bus or memory controller, a peripheral bus, video bus, or the like. The CPU 2510 may comprise any type of electronic data processor. The memory 2520 may comprise any type of system memory such as static random access memory (SRAM), dynamic random access memory (DRAM), synchronous DRAM (SDRAM), read-only memory (ROM), a combination thereof, or the like. In an embodiment, the memory 2520 may include ROM for use at boot-up, and DRAM for program and data storage for use while executing programs.

The mass storage device 2530 may comprise any type of storage device configured to store data, programs, and other information and to make the data, programs, and other information accessible via the bus 2540. The mass storage device 2530 may comprise, for example, one or more of a solid state drive, hard disk drive, a magnetic disk drive, an optical disk drive, or the like.

The I/O interface 2560 may provide interfaces to couple external input and output devices to the processing unit 2501. The I/O interface 2560 may include a video adapter. Examples of input and output devices may include a display coupled to the video adapter and a mouse/keyboard/printer coupled to the I/O interface. Other devices may be coupled to the processing unit 2501 and additional or fewer interface cards may be utilized. For example, a serial interface such as Universal Serial Bus (USB) (not shown) may be used to provide an interface for a printer.

The antenna circuit 2570 and antenna element 2575 may allow the processing unit 2501 to communicate with remote units via a network. In an embodiment, the antenna circuit 2570 and antenna element 2575 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 2570 and antenna element 2575 may also provide Bluetooth and/or WiFi connection to other devices.

The processing unit 2501 may also include one or more network interfaces 2550, which may comprise wired links, such as an Ethernet cable or the like, and/or wireless links to access nodes or different networks. The network interface 2501 allows the processing unit 2501 to communicate with remote units via the networks 2580. For example, the network interface 2550 may provide wireless communication via one or more transmitters/transmit antennas and one or more receivers/receive antennas. In an embodiment, the processing unit 2501 is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:

[1] 3GPP TR 22.803 V12.0.0 (2013-12).
[2] 3GPP TS 36.211 V12.0.0 (2012-12).
[3] 3GPP RAN1 contribution R1-130883.
[4] 3GPP TS 36.321V11.2.0 (2013-03).
[5] 3GPP TS 36.213 V11.1.0 (2012-12).
[6] 3GPP TS 36.133 V11.4.0 (2013-03).
[7] 3GPP TS 36.331 V11.2.0 (2012-12).
[8] 3GPP TR 36.321 V11.3.0 (2013-06).
[9] Enhanced Inter-cell Interference Coordination for Heterogeneous Networks in LTE Advanced: A Survey, available at: http://arxiv.org/ftp/arxiv/papers/1112/1112.1344.pdf.
[10] 3GPP TR 36.300 V11.3.0 (2012-09).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for a UE performing device-to-device (D2D) communication, the method comprising:
  receiving, by the UE, a group ID identifying a D2D group that comprises a plurality of UEs for D2D communications, the group ID being associated with the plurality of UEs in the D2D group;

receiving, by the UE from a base station, a configuration for D2D communications of the D2D group, the configuration indicating whether a subframe is configured for the D2D communications of the D2D group;

generating, by the UE, a D2D buffer status report (BSR) for D2D communications by the UE in the D2D group triggered by expiry of a D2D BSR timer, the D2D BSR comprising information of an amount of D2D data available for transmission by the UE in the D2D group, the D2D BSR timer being configured for D2D BSR reporting by the UE, the D2D BSR timer different than a periodicBSR-Timer and a retxBSR-Timer that are configured for cellular BSR reporting by the UE, and the D2D BSR comprising the group ID identifying the D2D group and a D2D BSR logical channel identifier (LCID) of the D2D BSR;

transmitting, by the UE, the D2D BSR to the base station on an uplink channel in a control element;

receiving, by the UE from the base station, a resource allocation for D2D communications of the UE in the D2D group in response to transmitting the D2D BSR;

transmitting, by the UE to the D2D group, D2D data over an allocated resource in response to determining that the allocated resource is configured for D2D communications according to the configuration that is received; and retransmitting, by the UE, the D2D BSR upon receipt of less than a threshold number of Acknowledgement (ACK) messages for the D2D group, an ACK message being for acknowledging receipt of the D2D BSR.

2. The method of claim 1 further comprising:
generating a cellular BSR for a communication, wherein the cellular BSR comprises a second LCID for the cellular BSR; and
transmitting the cellular BSR in a second control element.

3. The method of claim 1 wherein the amount of D2D data available for transmission is for transmission on a D2D communication link.

4. The method of claim 1 wherein the step of generating is triggered by an expiry of a periodic D2D BSR timer.

5. The method of claim 1 wherein the step of generating is triggered by an expiry of a retransmission D2D BSR timer and the amount of D2D data available is greater than zero.

6. The method of claim 5 wherein the retransmission D2D BSR timer is reset when the UE receives the resource allocation.

7. The method of claim 1 wherein the D2D BSR comprises a D2D group ID associated with a D2D communication link.

8. The method of claim 1, further comprising:
retransmitting, by the UE, the D2D BSR upon expiry of a first retransmission D2D BSR timer of the D2D group.

9. A method for a UE performing device-to-device (D2D) communication, the method comprising:
starting a first retx-D2D-BSR-Timer for a first D2D group having a first D2D group ID identifying the first D2D group;
starting a second retx-D2D-BSR-Timer for a second D2D group having a second D2D group ID identifying the second D2D group, the UE belonging to both the first D2D group and the second D2D group, and each of the first D2D group and the second D2D group comprising a plurality of UEs for D2D communications, wherein each of the first retx-D2D-BSR-Timer and the second retx-D2D-BSR-Timer is configured for D2D BSR reports and is different than a periodicBSR-Timer and a retxBSR-Timer that are configured for cellular BSR reporting by the UE;

receiving, from a base station, a configuration for D2D communications of the first D2D group, the configuration indicating whether a subframe is configured for the D2D communications of the first D2D group;

generating a first D2D buffer status report (BSR) for D2D communications triggered by expiration of the first retx-D2D-BSR-Timer, the first D2D BSR comprising information of an amount of D2D data available for transmission in the first D2D group, wherein the first D2D BSR comprises the first D2D group ID;

transmitting the first D2D BSR to the base station on an uplink channel in a control element, the control element comprising a D2D BSR logical channel identifier (LCID) of the first D2D group;

receiving, from the base station, a resource allocation for D2D communications of the first D2D group in response to transmitting the first D2D BSR;

performing D2D transmission in the first D2D group using an allocated resource in response to determining that the allocated resource is configured for D2D communications according to the configuration that is received; and retransmitting the first D2D BSR upon receipt of less than a threshold number of Acknowledgement (ACK) messages for the first D2D group, an ACK message being for acknowledging receipt of the first D2D BSR.

10. A user equipment (UE) for managing a device-to-device (D2D) communication comprising:
a processor; and
a non-transitory computer readable storage medium storing programming for execution by the processor, the programming including instructions to:
receive, from a base station, a configuration for D2D communications of a D2D group, the configuration indicating whether a subframe is configured for the D2D communications of the D2D group, the D2D group being identified by a group ID and comprising a plurality of UEs for D2D communications, with the group ID being associated with the plurality of UEs in the D2D group;
generate a D2D buffer status report (BSR) for D2D communications by the UE in the D2D group triggered by expiry of a D2D BSR timer, the D2D BSR comprising information related to an amount of D2D data available for transmission in the D2D group, the D2D BSR timer being configured for D2D BSR reporting by the UEs and being different than a periodicBSR-Timer and a retxBSR-Timer that are configured for cellular BSR reporting by the UE, and the D2D BSR comprising the group ID identifying the D2D group;
transmit the D2D BSR to the base station on an uplink channel in a control element, the control element comprising a D2D BSR logical channel identifier (LCID) of the D2D group;
receive, from the base station, a resource allocation for D2D communications of the UE in the D2D group in response to transmitting the D2D BSR;
transmit D2D data over an allocated resource to the D2D group in response to determining that the allocated resource is configured for D2D communications according to the configuration that is received;
transmit, to the base station, a set of link qualities for a plurality of links; and retransmit the D2D BSR upon receipt of less than a threshold number of Acknowledgement (ACK) messages for the D2D group, an ACK message being for acknowledging receipt of the D2D BSR.

* * * * *